United States Patent
Dold

(10) Patent No.: US 9,645,555 B2
(45) Date of Patent: May 9, 2017

(54) SAFETY SYSTEM

(71) Applicant: SICK AG, Waldkirch/Breisgau (DE)

(72) Inventor: Franz Josef Dold, Furtwangen (DE)

(73) Assignee: SICK AG, Waldkirch/Breisgau (DE)

( * ) Notice: Subject to any disclaimer, the term of this patent is extended or adjusted under 35 U.S.C. 154(b) by 775 days.

(21) Appl. No.: 14/045,871

(22) Filed: Oct. 4, 2013

(65) Prior Publication Data

US 2014/0100675 A1   Apr. 10, 2014

(30) Foreign Application Priority Data

Oct. 10, 2012   (EP) .................................... 12187981

(51) Int. Cl.
  *G05B 9/02* (2006.01)
  *G05B 19/042* (2006.01)
(52) U.S. Cl.
  CPC ........... *G05B 9/02* (2013.01); *G05B 19/0428* (2013.01); *G05B 2219/1179* (2013.01); *G05B 2219/14012* (2013.01)
(58) Field of Classification Search
  CPC .................. G05B 9/02; G05B 19/0428; G05B 2219/1179; G05B 2219/14012
  See application file for complete search history.

(56) References Cited

U.S. PATENT DOCUMENTS

| | | | |
|---|---|---|---|
| 4,630,233 A | 12/1986 | Weppler | |
| 5,487,448 A | 1/1996 | Schollkopf et al. | |
| 6,832,343 B2* | 12/2004 | Rupp .................. | G05B 9/03 700/21 |
| 7,411,319 B2* | 8/2008 | Suhara .................. | G05B 9/03 307/326 |
| 8,522,204 B2* | 8/2013 | Moosmann ............. | G05B 9/03 717/117 |
| 8,560,094 B2* | 10/2013 | Ehrhart .............. | G05B 19/0425 700/12 |

(Continued)

FOREIGN PATENT DOCUMENTS

DE   10 2004 020 997 A1   11/2005
DE   10 2008 032 823 A1    1/2010
(Continued)

OTHER PUBLICATIONS

European Search Report with translation, seven (7) pages.
ODVA Planning and Installation System, DeviceNet Cable System, PUB00027R1, ninety-eight (98) pages.

*Primary Examiner* — Charles Kasenge
(74) *Attorney, Agent, or Firm* — Nath, Goldberg & Meyer; Jerald L. Meyer

(57) ABSTRACT

A safety system includes a safety unit and at least one safety related participant which comprises a protective device and a first and a second interruptible signal transmission path which can be interrupted together on the occurrence of a non-secure state of the protective device. The safety system includes at least one test signal path which runs through the safety related participant to a safety input of the safety unit starting from an output of the safety unit and comprises at least one of the first and the second interruptible signal transmission paths. The safety related participant comprises an interruption switch arranged in the test signal path and an evaluation unit which is connected to the first signal transmission path and/or to a first switching signal output of the protective device and to the second signal transmission path and/or to a second switching signal output of the protective device.

12 Claims, 8 Drawing Sheets

(56) References Cited

U.S. PATENT DOCUMENTS

Figure 1:
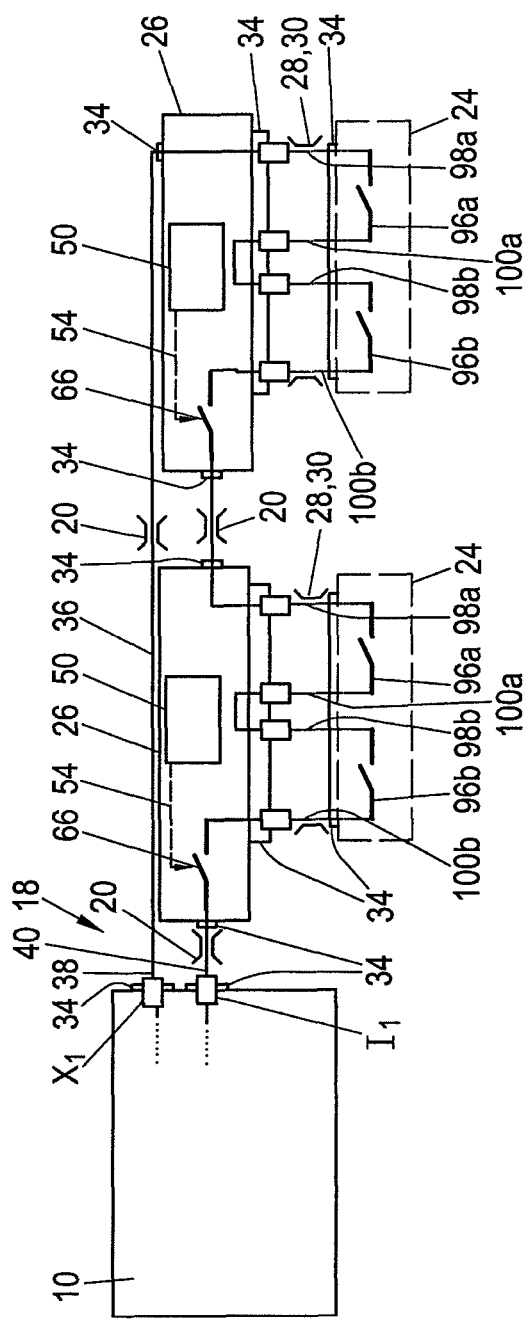

| | | | |
|---|---|---|---|
| 8,595,827 B2* | 11/2013 | Zondler | G05B 9/02 700/20 |
| 2002/0093951 A1* | 7/2002 | Rupp | G05B 9/03 370/362 |
| 2006/0244619 A1 | 11/2006 | Nickels | |
| 2009/0024230 A1* | 1/2009 | Hioka | G05B 19/0426 700/17 |
| 2009/0222107 A1 | 9/2009 | Moddemann et al. | |
| 2009/0231123 A1 | 9/2009 | Rowell et al. | |
| 2009/0265571 A1 | 10/2009 | Furukawa et al. | |
| 2011/0098829 A1 | 4/2011 | Weddingfeld et al. | |
| 2011/0112700 A1 | 5/2011 | Tajima | |
| 2011/0301720 A1* | 12/2011 | Ehrhart | G05B 19/0425 700/12 |
| 2012/0005748 A1* | 1/2012 | Zondler | G05B 9/02 726/21 |

FOREIGN PATENT DOCUMENTS

| | | |
|---|---|---|
| DE | 10-2010 025 675 B3 | 11/2011 |
| DE | 10 2011 079 688 A1 | 4/2012 |
| DE | 20 2010 016 148 U1 | 4/2012 |
| DE | 10 2011 016 137 A1 | 10/2012 |
| EP | 1 363 306 A2 | 11/2003 |
| EP | 1 393 280 A1 | 3/2004 |
| EP | 1 699 203 A1 | 9/2006 |
| EP | 2 051 422 A1 | 4/2009 |
| EP | 2 101 237 A2 | 9/2009 |
| EP | 2 209 262 A1 | 7/2010 |
| EP | 2 362 408 A1 | 8/2011 |

* cited by examiner

SAFETY SYSTEM

The present invention relates to a safety system which can, for example, be used for recognizing a hazardous situation at a safety critical plant or machine and for carrying out a safety related cutoff in the hazardous situation.

Such a safety system typically comprises a safety unit configured e.g. as a safety control having an output and a safety input and having at least one safety related participant which has a protective device or which is formed by a protective device. In this connection a test signal line and/or bus line connected to the output and to the safety input together with the safety related participant forms a test signal path for transmitting a test signal generated by the safety unit. A safety related participant used in such a safety system typically has at least one interruptible signal transmission path arranged in the test signal path and is configured to bring about an interruption of the interruptible signal transmission path and in this way an interruption of the test signal path on the presence and/or occurrence of a non-secure state. Since the test signal path uses the interruptible signal transmission path as a direct transmission path for the test signal, the expected test signal remains absent at the safety input of the safety unit as a consequence of such an interruption. The safety unit can then carry out a safety related measure and can, for example, interrupt the current supply to the safety critical plant and thereby switch this off, whereby the safety system satisfies a safety related function.

In order to satisfy particularly high requirements with respect to the achieved safety, multi-channeled safety related participants and/or protective devices, in particular two-channeled safety related participants and/or protective devices are frequently used, this means safety related participants having a first and a second interruptible signal transmission path which are interrupted together on the occurrence of a non-secure state of the protective device. The safety system can be adapted in such way that already the interruption of one of the two interruptible signal transmission paths leads to a safety related cutoff in such a way that as a result a redundancy is made available by the protective function made available by the safety related participants.

In principle a safety system can also have a plurality of safety related participants which can each have one or more interruptible signal transmission paths and which can e.g. be arranged locally distributed at the safety critical plant, wherein a non-secure state of an arbitrary safety related participant and an in this way inherent interruption of a corresponding signal transmission path should respectively lead to the activation of the safety related function. The making available of such a safety system is associated with a very high demand in cabling, when each safety related participant or even each interruptible signal transmission path of each safety related participant is connected to the safety unit via an own test signal path as described in the foregoing. Moreover, a corresponding number of outputs and safety inputs has to be provided at the safety unit in this case.

In principle it is known to switch a plurality of interruptible signal transmission paths of a safety system, which can belong to the same multi-channeled safety related participant or can belong to different safety related participants in a row in a common test signal path in such a way that an interruption of an arbitrary one of the interruptible signal transmission paths leads to an interruption of the common test signal path and to an activation of the safety related function. Thereby, the required demand in cabling is reduced.

However, the safety of the safety system is impaired thereby. For example, when e.g. two signal transmission paths of a two-channeled and/or multi-channeled safety related participant interruptible in common are connected in a row in a common test signal path, an activation of the safety related function does indeed also then take place when, for the presence of a non-secure state only one of the two signal transmission paths is interrupted due to an error function deviating from the common interruptability of both signal transmission paths in accordance with the function and thus a discrepancy of the states of the two redundant signal transmission paths is present. However, this error function of the safety related participant, which is also referred to as a discrepancy error, remains undetected, since this case of error cannot be differentiated from an orderly case of activation from the point of view of the safety unit in such a way that the redundancy intended by the two channels is lost in an unnoticed manner. After that the possibility exists that the protective function of the safety related participant is completely lost on an accumulation of errors, this means for an error function of the other interruptible signal transmission paths.

When the two interruptible signal transmission paths of the same two-channeled and/or multi-channeled safety related participant are arranged in two parallel test signal paths separate from one another, it is in principle possible for a safety unit connected to the two test signal paths to recognize when a discrepancy of the states of the two test signal paths is present, this means when one of the test signal paths is interrupted and the other one is closed and in this case to trigger a safety related cutoff. However, when the interruptible signal transmission paths of a plurality of different safety related participants are respectively connected in a row at one of the test signal paths for the purpose of a less demanding cabling it is not possible to determine which safety related participant arranged in the test signal path possibly has a discrepancy error in the case of such an error recognition, since only a summed information is respectively made available via the test signal paths on whether generally one or more of the interruptible signal transmission paths arranged in the test signal paths are interrupted.

Moreover, in the last mentioned case it is not possible to reliably determine whether an occurring state of error of a safety related participant has been completely corrected and an erroneous and/or mistaken error acknowledgement can take place at the safety unit, this means that the safety unit mistakenly assumes that the recognized error has been remedied. The safety unit can namely be adapted to acknowledge the error in accordance with a previously described recognition of a discrepancy error and to enable a restart of the plant once a complete orderly switching sequence of the two test signal paths has been recognized, this means when an interrupted state of both test signals paths is followed by a non-interrupted state of both test signal paths. Such a switching sequence can, however, be generated by a user thereby that all of the safety related participants switched in a row are transferred into the non-secure state and subsequently into the secure state. Also when the erroneous signal transmission path of the erroneous safety related participant is not open in this connection due to its error function, the associated test signal path is still interrupted in this respect by one of the other safety related participants—generally speaking a functional safety related participant—in such a way that an orderly switching sequence is simulated. The error function of the erroneous safety related participant is thus logically compensated by the orderly function of the other safety related participants in such a way that the error is mistakenly acknowledged by the safety unit whereupon the safety of such a safety system is impaired. Such a mistaken acknowledgement of error could be avoided in that the redundant signal transmission paths of the safety related participants are individually connected to the safety unit or to a further central control connected to the safety unit and is then monitored for a discrepancy by this, whereby in turn, however, a considerable demand in effort and cost for the additional cabling, evaluation and monitoring has to be provided.

For this reason it is the object of the invention to provide a safety system which can be made available with a low demand in effort and cost, in particular a low demand in cabling and at the same time reliably ensures a high safety level.

This object is satisfied by a safety system having the features of claim 1.

The safety system in accordance with the invention comprises a safety unit, which is preferably formed by a safety control, and at least one safety related participant which comprises a protective device and at least a first interruptible signal transmission path and a second interruptible signal transmission path which can be interrupted together on the occurrence of a non-secure state of the protective device. The safety system further comprises at least one test signal path which starting from an output of the safety unit runs through the at least one safety related participant to a safety input of the safety unit and which comprises at least one of the first and the second interruptible signal transmission paths. The safety related participant moreover comprises an interruption switch arranged in the test signal path and an evaluation unit which is connected to the first signal transmission path and/or to a first switching signal output of the protective device controlling the interruption of the first signal transmission path and which is connected to the second signal transmission path and/or to a second switching signal output of the protective device controlling the interruption of the second signal transmission path. The evaluation unit is adapted to, preferably continuously, check whether the first and the second signal transmission paths together are interrupted or are controlled for interruption and to open the interruption switch when the first and the second interruptible signal transmission paths together are not interrupted or controlled for interruption.

By means of the evaluation unit being integrated in the safety related participant it is thus locally recognized when the two interruptible signal transmission paths together are not interrupted or controlled for interruption. The evaluation unit in this case interrupts the test signal path by opening the interruption switch. The interruption of the test signal path reliably leads to an absence of the expected test signal at the safety unit and consequently leads to an activation of the safety related function of the safety unit. Thus, it is ensured that the occurring error is both recognized and that a suitable safety related measure is carried out without additional lines or signal transmission paths between the safety related participant and the safety unit being required for this. Rather more a local error recognition and a local interruption of the anyway present test signal path is used in order to trigger the safety related measure.

It is locally recognized at the safety related participant by the evaluation unit when the two interruptible signal transmission paths no longer switch together, this means when a discrepancy of the two protective channels and thus an error function of the safety related participant is present. Such an error function can, for example, be brought about by a fusing of one of the switching contacts of the safety related participants which prevents an orderly opening of the switching contact on the occurrence of the non-secure state of the protective device or by an error function of one of the switching signal outputs of the protective device, for example, when its switching signal continuously represents a secure state of the protective device. For example, an interruption of the test signal path and in this way a safety related cutoff is indeed brought about for a switching in a row of the two signal transmission paths of the same safety related participants in the test signal path also for an orderly triggering of only one of the protective channels, this means only one of the interruptible signal transmission paths; however, the redundancy intended by the provision of the two interruptible signal transmission paths and the in this way inherent increase of the safety is lost. The error recognition by means of the evaluation unit, however, prevents a first error in the form of such an error function of a protective channel remaining undetected and being tolerated and thereby the possibility of an error accumulation is generated in such a way that an error function of the one of other protective channels leads to a complete loss of the securing function of the safety related participant.

As a consequence of the local check of the common interruption of the two interruptible signal transmission paths on the occurrence of a non-secure state of the protective device it is possible to connect a plurality of interruptible signal transmission paths of the same or of different safety related participants in a common test signal path in a row without a loss of the high safety level. Through the local error recognition and interruption of the test signal path it is namely prevented, as described in the foregoing, that an error of the safety related participant remains completely undetected. In contrast to this, the evaluation unit is in the position to differentiate between a discrepancy error and an orderly triggering of the safety related function by a safety related participant. Furthermore, an error function of this safety related participant can be determined through the local evaluation for the interruptible signal transmission paths of a safety related participant, in particular to determine an error function of this safety related participant in such a way that the erroneous safety related participant can be identified and a mistaken error acknowledgement on the basis of an error-free function of a different safety related participant can be excluded. In this connection an erroneous safety related participant can be indicated to a user and thus the user can be prompted to specifically remove the error and/or to exchange the respective erroneous safety related participant.

The possibility of switching into a row reduces the demand in cabling and the number of the required inputs and outputs of the central safety unit and thus also the spatial requirements in a switching cabinet receiving the safety unit. Thus, a safety system is created which can be realized with a very small demand in effort and cost, in particular with a small demand in cabling which at the same time satisfies a very high safety level.

Advantageous embodiments of the invention are described in the subordinate claims, the description and the Figures.

The safety unit is preferably adapted in such a way that, on an absence of the expected test signal at the safety input, a safety related function provided by the safety unit is activated. The safety related function preferably leads to a safety critical plant monitored by the safety system being transferred into a secure state the fact or consists therein that a safety critical plant monitored by the safety system is transferred into a secure state, for example, in that the plant is switched off and, in particular its current supply is interrupted. Likewise the safety unit can monitor whether the expected test signal is incoming and can generate a monitoring signal in dependence on the result of the monitoring.

The safety unit can, in principle, comprise a safety component, such as, e.g. a safety relay, a safety sensor, a safety actor or a drive and/or can be formed thereby, wherein, for example, a safety relay can be controlled by the incoming test signal, in particular directly controlled by the incoming test signal and can be arranged in the current supply of the plant in such a way that an opening of the relay brings about an interruption of the current supply to the plant. The safety unit can be an integral component of a cascade of safety related participants, for example, a light grid cascade having a plurality of light grids, a laser scanner assembly having a plurality of laser scanners or a relay cascade having a plurality of relays. The safety unit can also be formed by a safety drive having a direct emergency cutoff connection or a secure valve island having a direct emergency cutoff connection, wherein the emergency cutoff connection preferably forms the output and the safety input of the safety unit. The emergency cutoff connection can, for example, be connected to a previously described safety relay.

Preferably, the safety unit is formed by a safety control which is e.g. adapted to actively control the monitored plant or an installation connected thereto on the absence of the expected test signal in order to transfer the plant into a secure state. For example, the safety control can bring about an interruption of the current supply to the plant, in particular by controlling a relay or a different interruption element arranged in a current supply line. The safety unit and/or the safety control can comprise a digital logic unit which can comprise one or more microprocessors. The logic unit preferably controls the transmission of the output signal and/or the evaluation of the incoming test signal. The safety unit and/or the safety control can be formed by a memory programmable control.

The at least one safety related participant preferably comprises at least one secure protective device which is configured to take on a secure state or a non-secure state in dependence on an outer influence relevant for the safety of e.g. a person. For example, it can be an emergency cutoff switch which comprises one or more e.g. mechanical switching contacts which are closed in the secure state, this means the non-actuated state of the emergency cutoff switch and which are open in the non-secure state, this means the actuated state of the emergency cutoff switch. A further example is a locking apparatus of a safety door which has one or more, in particular magnetically controlled switching contacts which are closed in the secure state of the door, this means the closed state of the door and which are open in the non-secure position of the door, this means the open position of the door.

A safety related participant preferably comprises at least two equivalently switching interruptible signal transmission paths, this means the safety related participant is configured to either close both interruptible signal transmission paths or to open both interruptible signal transmission paths in dependence on the secure or the non-secure state of the protective device and indeed preferably substantially at the same time. The system can in principle also comprise at least one safety related participant or a protective device having two antivalently switching interruptible signal transmission paths, this means a safety related participant and/or a protective device in which a signal transmission path is closed in the secure state and a different signal transmission path is open while in the non-secure state the one signal transmission path is open and the other signal transmission path is closed. Preferably, the switching state of at least one signal transmission path is then imaged by a subsequently described conversion and/or imaging onto the oppositely set switching state of a further interruptible signal transmission path in such a way that at least two equivalently switching signal transmission paths are in turn present in the safety related participant which can be interrupted together on the occurrence of a non-secure state.

The first and/or the second interruptible signal transmission path of the safety related participants can respectively be a part of the protective device, this means they can be formed by a first and/or a second interruptible signal transmission path of the protective device which respectively directly take on the closed or the opened state in dependence on the secure or the non-secure state of the protective device.

In principle it is, however, also possible that the secure or the non-secure state of the protective device is imaged and/or converted to a closed and/or open state of the first and/or the second interruptible signal transmission path via, for example, an electrical or electronic conversion. In this connection the protective device can, for example, comprise a first and/or a second switching signal output which outputs a switching signal which represents the secure or the non-secure state of the protective device, wherein the associated first and/or second interruptible signal transmission path can be controlled in dependence on this switching signal and is closed in the secure state and/or is open in the non-secure state. In this case the first and/or the second signal transmission path can also be arranged outside of the protective device and can be coupled to the protective device in a corresponding manner. For example, the first and the second signal transmission paths can be arranged in an interconnection module at the safety related participant which will be explained in detail in the following and which is connected to the protective device via an interconnection line.

The evaluation unit can also serve to recognize a line error, such as, in particular a short-circuit or a cross-circuit which can be present in one or more connection lines which connect the different protective channels of the protective device to an interconnection module which is explained in the following in more detail and in which the evaluation unit is preferably received. A connection line can, for example, comprise a forward line and a return line between which a respective interruptible signal transmission path of a protective device is switched in series or a switching signal line which connects a previously described switching signal output of the protective device to the interconnection module.

In order to check the switching state of the interruptible signal transmission paths, the evaluation unit can e.g. be respectively connected to a forward line and a return line between which the respective interruptible signal transmission paths are switched in series. The forward line and the return line in this connection can be a part of an interconnection line and can serve to connect the interruptible signal transmission path which can e.g. be a part of the protective device, to the interconnection module described in the following and in which the evaluation unit is arranged. In this case the evaluation unit can also recognize a line error, such as, in particular a short-circuit or a cross-circuit between the forward lines and the return lines. For example, a short-circuit between the forward line and the return line of the same interruptible signal transmission path or also a cross-circuit between the forward line or the return line of an interruptible signal transmission path and the forward line or the return line of the other signal transmission path can appear as a continuously closed first or second signal transmission path from the point of view of the evaluation unit and for this reason can lead to a discrepancy error like for a fused switching contact in such a way that the evaluation unit can also recognize such an error.

The recognition of line errors by means of the evaluation unit can enable the danger-free routing of a plurality of connection lines and/or forward lines and return lines of a multi-channel protective device in a common interconnection cable.

The safety unit is preferably configured to generate a preferably dynamic output signal and/or test signal and to transmit this to the test signal path and/or to receive a preferably dynamic test signal from the test signal path and to check whether the received test signal corresponds to an expected test signal. The transmitted output signal and/or the received test signal can in this connection, for example, have a high level with a regular, in particular periodically recurring test gap interrupting the high level.

The safety related participant can further comprise one or more further interruptible signal transmission paths in addition to the first and the second interruptible signal transmission path which can be interrupted together with the first and the second interruptible signal transmission paths on the occurrence of a non-secure state of the protective device. The evaluation unit then preferably checks whether all signal transmission paths of the safety related participants interruptible in common are interrupted together or together are controlled for interruption and otherwise opens the interruption switch.

In accordance with an advantageous embodiment the two interruptible signal transmission paths of the safety related participants are connected electrically in series in the test signal path. Through the use of a common test signal path a one-channeled evaluation unit of both protective channels is enabled and the demand required for the cabling is significantly reduced, wherein at the same time the interruption of at least one of the interruptible signal transmission paths leads to an interruption of the test signal path and in this way to an activation of the safety related function, in such a way that the redundant protective function of the two channels of the safety related participants is utilized. In this connection it is ensured that a discrepancy error, this means a non-common interruption and/or a corresponding control of the two signal transmission paths does not remain unrecognized, but reliably leads both to an activation of the safety related function as well as to an error recognition through the evaluation unit and the interruption switch.

In accordance with a further advantageous embodiment at least one of the interruptible signal transmission paths of a safety related participant is electrically connected in series to an interruptible signal transmission path of a further safety related participant of the safety system arranged in the test signal path. In this manner a plurality of safety related participants can be connected to the safety unit on use of a common test signal path. Thus, a cascade of safety related participants is realized in a simple manner and with a low demand in effort and cost, wherein an interruption of at least one of the interruptible signal transmission paths of an arbitrary safety related participant of the cascade leads to the interruption of the test signal path and in this way to an activation of the safety related function. In this connection a mistakenly carried out error acknowledgement is excluded through the local check on discrepancy errors following an error function of a safety related participant due to an error-free function of the other safety related participant.

In accordance with an embodiment the safety unit comprises two test signal paths respectively arranged between an output and a safety input of the safety unit to which a plurality of safety related participants having two interruptible signal transmission paths are respectively connected, wherein the first signal transmission path of a safety related participant is arranged in the one test signal path and the second signal transmission path of a safety related participant is arranged in the other test signal path. A safety related participant can then have an interruption switch arranged in the first test signal path and an interruption switch arranged in the second test signal path configured for the interruption of the respective test signal path and can be configured to open at least one and preferably both interruption switches on the recognition of a discrepancy error of the safety related participant.

Preferably, the safety unit and the safety related participant are connected via at least one cable in which a core and/or a conductor is/are arranged which forms or form a section of the test signal path. Preferably, the at least one safety related participant is likewise connected to further safety related participants via one or more cables in which likewise a respective core respectively a conductor is arranged which forms or form a section of the test signal path. The cables can, for example, form a bus cable of a bus system. In this connection the safety related participants can be distributed locally over the safety critical plant and can be connected to one another via the cable.

In accordance with the invention the first and the second interruptible signal transmission paths of the safety related participants are together interrupted on the occurrence of a non-secure state of the protective device. This means that the two interruptible signal transmission paths congruently and together indicate the secure and the non-secure state of the protective device for an error-free function, this means a change of the protective device between the secure and the non-secure state leads to a common interruption or closure of both interruptible signal transmission paths, this means a preferably substantially simultaneous and/or synchronous interruption or closure of both interruptible signal transmission paths.

Preferably, the evaluation unit is configured to check whether the two signal transmission paths are simultaneously closed or controlled for closure apart from a predefined discrepancy time. Likewise the evaluation unit can be configured to check whether the two signal transmission paths are simultaneously closed or controlled for closure apart from a predefined discrepancy time, for example, on a start or a restart of the safety system. Such a start monitoring can be realized separate from the monitoring of the common interruption of the signal transmission path. If it is determined that the two signal transmission paths are not interrupted or closed at the same point in time and/or are correspondingly controlled, this means that a discrepancy error arises, then the evaluation unit can, for example, open the interruption switch and thus actively bring about an interruption of the test signal path. The evaluation unit can also be configured in order to transmit a corresponding piece of information in a different manner for triggering a safety related function and/or, for example, to indicate an error function. In order to monitor the simultaneousness of the interruption or the control for interruption and/or the simultaneousness of the closure or control for closure, the evaluation unit can, for example, comprise a correspondingly adapted microprocessor and/or have an own time base, such as, e.g. a clock generator of the microprocessor.

The evaluation unit including a possibly present microprocessor is preferably arranged in a housing of the safety related participant, for example a housing in accordance with the housing protective type IP 67 or IP 20.

Different types of interruptible signal transmission paths as described in the following can in principle be used in the framework of the invention, wherein the first and the second interruptible signal transmission paths of the safety related participant can be of the same type or also of different types.

An interruptible signal transmission path can, for example, be configured as an electrical switching path and comprise an electrical or electronic switch which in the secure state of the protective device is present in its closed electrically conductive state and which in the non-secure state of the protective device is present in its open electrically non-conductive state. In this case, the evaluation unit is preferably connected to a forward line arranged at an end of the switch and to a return line arranged at the other end of the switch respectively via a signal path in order to monitor the switching state in the context of the checking of the common interruption of both signal transmission paths. An electrical switch preferably comprises a mechanical electrical switching contact which can, for example, be mechanically actuatable, for example, a mechanically actuatable switching contact of a protective device configured as an emergency cutoff switch, or which can be electrically actuatable, such as, e.g. the switching contact of a safety relay. The switching contact can also be magnetically actuatable, such as e.g. the switching contact of a Reed switch, which can, for example, be used in a protective device configured as a door lock and which can be closed and interrupted by closing and opening the door.

An electronic switch preferably comprises an electronically controllable switch, such as, e.g. a transistor, in particular a bipolar transistor or a field effect transistor. Such an electronic switch can be connected to a switching signal output of the protective device which transmits or makes available a switching signal representing the secure or the non-secure state of the protective device, wherein the electronic switch is electronically controlled in dependence on the switching signal and is closed or opened in accordance with the secure or the non-secure state of the protective device. The state "secure" or "non-secure" represented by the switching signal is thus electronically converted and imaged onto a closed or open state of the interruptible signal transmission path formed by the switch. For this design the evaluation unit can, on the one hand, be directly connected to the forward line and the return line of the switch via corresponding signal paths in order to determine whether the switch is open or closed in the context of the discrepancy check. Likewise the evaluation unit can be connected to the switching signal output via a corresponding signal path in order to determine whether the switch is controlled for opening or closing in the context of the discrepancy check. The protective device can, for example, be configured as an optical protective device, such as, e.g. a light barrier, a light grid or a laser scanner. The switching signal output can be configured as an active and/or a digital switching signal output and is preferably a semiconductor-based switching signal output, such as, e.g. an OSSD (output signal switching device) switching signal output and/or as a pnp-semiconductor-based switching signal output.

An imaging of the switching state as previously described via a switching signal can also be used to image a closed state of a switch of the protective device onto an open state of the first and/or the second interruptible signal transmission path and vice versa in such a way that also protective devices having one or more switches can be used which are open in the secure state of the protective device and are closed in the non-secure state. For this purpose, the switching state of the respective switch can be imaged onto the respectively other switching state of the first and/or the second interruptible signal transmission path. The switch of the protective device and/or its forward line and return line then represent a switching signal output, in particular a passive switching signal output of the protective device, wherein a switching signal present at this switching signal output is used for the control of the first and/or the second interruptible signal transmission path and can be monitored by the evaluation unit, as previously described.

In accordance with an embodiment the safety related participant has two electrical switching contacts as a first and a second signal transmission path. The switching contacts can be mechanically compulsory guided for a common change of their switching state, however, in particular also safety related participants having two non-mechanically compulsory guided electrical switching contacts can be used, for example, safety related participants having two Reed switch contacts.

The first and/or the second interruptible signal transmission path can furthermore, be an optical signal transmission path, for example, a light path defined by the transmitter and the receiver of a light barrier, which runs e.g. through a spatial zone to be protected and can be interrupted by an object entering into the spatial zone.

The evaluation unit preferably realizes a restart lock for the safety-critical plant following a discrepancy error recognized by the evaluation unit. In this connection the evaluation unit can be adapted to open and to only close the interruption switch when the two signal transmission paths together are not interrupted or have been controlled for the interruption when a removal of the recognized error and/or corresponding error acknowledgement has taken place. In this connection, the evaluation unit does not already switch the interrupted switch when the protective device takes on its secure state and the two signal transmission paths have been closed again or have been controlled for closure. Thereby the error that one of the two interruptible signal transmission paths was continuously closed or controlled for closure has namely not been remedied. Rather more in this case, at least generally, an exchange of the safety related participant and/or, in particular of the protective device is required before the restart of the safety system and of the plant can be enabled by a closure of the interruption switch.

The safety related participant can enable a user to acknowledge the error locally at the safety related participant, for example, via an input element present at the safety related participant after the exchange of the defective protective device. The interruption switch can then be held open for so long up until such an error acknowledgement has taken place through the user.

The evaluation unit can also be adapted, for the recognition of a remedy of the error, such as e.g. an exchange of the protective device, to check whether a complete orderly switching sequence follows an error recognition, such as the previously described error recognition, and whether an opening of the interruption switch took place and in this case to acknowledge the error. Such a switching sequence consists therein that the first and the second interruptible signal transmission paths of the safety related participant together are both opened and/or controlled for the opening and can subsequently together be closed and/or controlled for closure task. Following such a recognition the evaluation unit can then close the interruption switch again in such a way that a restart of the safety system and the plant associated therewith is enabled.

A check can, in particular comprise the fact that it is checked whether the opening and/or control for the opening of the signal transmission path takes place simultaneously at least within the scope of a predefined discrepancy time and/or in that it is checked whether the closure and/or control for closure of the signal transmission path takes place simultaneously at least within the scope of a predefined discrepancy time.

The safety related participant can comprise a messaging unit which is configured to generate a communication perceptible for a user, such as e.g. a visual display, for example, to indicate a recognized error to the user, in dependence on the check carried out by the evaluation unit of whether the two signal transmission paths together are interrupted or controlled for interruption. Alternatively or additionally the safety related participant can be configured to transmit a corresponding message to the safety unit by means of a data communication in the case of such an error, said message indicating the error.

A safety related participant as described herein can in principle be completely formed by a protective device which makes available the herein described functions. Preferably, at least one of the safety related participants, however, additionally comprises an interconnection module in addition to the protective device via which interconnection module the safety related participant is included in the safety system. The interconnection module and the protective device can be arranged in separate housings and/or can be connected to one another via an interconnection line which can comprise at least one interconnection cable. Such a separate interconnection module can be directly connected to the bus line in order to include the safety related participant in the test signal path. Such an interconnection module enables the installation of the already present protective devices into the safety system in accordance with the invention in a simple manner and in this respect to realize the herein described functions. The interconnection module preferably comprises the evaluation unit.

As was previously described the protective device itself can in principle have the first and/or the second signal transmission path interruptible on the occurrence of a non-secure state of the protective device, for example, a switch, an electrical switching contact or an interruptible light barrier. When the protective device itself has the first and/or the second interruptible signal transmission path, then the interconnection module can include the first and/or the second interruptible signal transmission paths in the safety system in such a way that it connects the first and/or the second interruptible signal transmission paths between the protective device and the interconnection module to the test signal path, preferably via an interconnection cable, such that the interruptible signal transmission path is a direct component of the test signal path and the test signal uses the interruptible signal transmission path as a direct transmission path.

In accordance with an advantageous embodiment the first and/or the second interruptible safety transmission path of the safety related participant comprises a switch arranged in the protective device which is included in the test signal path via a forward line and a return line, wherein the forward line and the return line are arranged in an interconnection line connecting the protective device and the interconnection module.

Likewise the protective device can have a first and/or a second switching signal output, in particular a digital switching signal output, such as e.g. an OSSD output, at which a switching signal is output and/or is present which represents the secure and the non-secure state of the protective device.

When the protective device comprises a first and/or a second switching signal output representing the secure or the non-secure state of the protective device then the first and/or the second interruptible signal transmission path of the safety related participant is preferably arranged in the interconnection module and is, for example, formed by an electronic switch. This is then preferably connected via a switching signal line arranged in the interconnection cable to the switching signal output of the protective device and is controlled in dependence on the switching signal present at the switching signal output in order to take on the secure and/or the non-secure state of the protective device corresponding to the closed and/or opened state.

In accordance with an advantageous embodiment, which is explained in more detail in connection with the description of the Figures, the interconnection module comprises a test signal input for an incoming test signal and a test signal output for an outgoing test signal. The protective device connected to the interconnection module via an interconnection line comprises at least a first and a second switch which are respectively connected to the interconnection module via a forward line and a return line of the interconnection line of the safety related participant. Each switch in this connection together forms a electrical switching path which forms an interruptible signal transmission path of the safety related participant with the associated forward line and return line, with the electrical switching path being connected in series in a common test signal path via a test circuit described in the following.

The interconnection module comprises a test circuit for the two switching paths which comprise a controlled current source, a controlled current sink and a current direction element. The test circuit for the two switching paths serves the purpose, of interrupting the signal transmitted via the test signal path or to respectively output a test signal at the test signal output which reliably leads to a violation of the expectation of the safety unit in the case of an open state of at least one of the two switches and in the case of a cross-circuit between the two switching paths in the interconnection line arranged between the interconnection module and the protective device.

For this purpose the test signal input of the interconnection module is connected to a control input of the controlled current source or of the controlled current sink in such a way that the controlled current source or current sink is controlled by the incoming test signal or a signal derived therefrom, wherein a controlled output of the same one of the current source and the current sink is connected to the forward line of the first switching path in order to transmit a current via the first switching path. The return line of the first switching path is connected to the control input of the respectively other one of the controlled current source and the controlled current sink in such a way that the controlled current source or current sink can be controlled via the current signal or a signal derived therefrom transmitted by the first switching path. The controlled output of the other one of the controlled current source and current sink is connected to the forward line of the second switching path in order to transmit a current via the second switching path. In this connection the return line of the second switching path is connected to a current direction element which is configured to provide a signal dependent on the current transmitted via the second switching path, in particular on its orientation. The test signal output of the interconnection module is connected to the current direction element in order to output the signal generated by the current direction element or a signal derived therefrom as an outgoing test signal of the safety related participants.

The protective device can also comprise one or more further switches in addition to the first and the second switch which can be included in the test signal path in series, for example, via the test circuit, for the formation of an electrical switching path in such a way that they close or interrupt the test signal path in dependence on their switching state.

The recognition of a cross-circuit between the two switching paths brought about by the previously described test circuit is based on the recognition that in the error-free operation and in the secure state of the protective device the current is driven through the two switching paths in different directions, since the current is driven through one of the electrical switching paths by a current source which generates an outgoing electrical current flow and the current is driven through the other electrical switching path by the current sink which generates an incoming electrical current flow. For this reason a cross-circuit between both switching paths leads to a change in direction of the current flow in the electrical switching path connected to the current direction element or at least to a reduction of the current flowing in the expected current flow direction in comparison to an error-free operation, this means in absence of a cross-circuit between both switching paths. The current direction element can recognize the presence of such a deviation of the current flow from the current flow of an error free operation and can ensure that a test signal is output and/or present at the test signal output of the safety related participant which deviates from the test signal transmitted during the error-free operation and which violates the expectation of the safety unit and thus leads to an activation of the safety related function.

In accordance with a further advantageous embodiment which is described in detail in connection with the description of the Figures, the safety system has a bus line which is connected to the output and the safety input of the safety unit, wherein a plurality of safety related participants which respectively comprise a protective device are connected to the bus line. At least one of and preferably each safety related participant is in this connection configured as a safety related participant, as described in the foregoing, having two interruptible signal transmission paths and an evaluation unit as previously described.

The bus line and the safety related participants connected to the bus line form the test signal path, wherein the test signal path comprises a forward path connected to the output of the safety unit and a return path connected at the safety input of the safety unit. A plurality of and preferably all of the safety related participants of the system are arranged along the bus line in a line in such a way that both the forward path and the return path of the test signal path run through the same safety related participants. The safety related participants are adapted in such a way that the presence of a non-secure state of their protective device brings about an interruption of the test signal path. The safety system further comprises a termination element preferably connected at the end of the line and connecting the forward path and the return path of the test signal path, wherein the safety unit is configured to transmit an output signal and/or a test signal at its output connected to the forward path, and wherein the termination element is configured to receive the output signal from the forward path and to output a test signal to the return path of the test signal path in dependence on the output signal received from the forward path, said test signal being changed with respect to the received output signal.

A line topology of the safety related participants connected to the common test signal path is formed due to the fact that both the forward path and the return path of the test signal path run through the safety related participants. The required demand in cabling is thereby even further reduced, since it is not required to route the forward path and the return path in a separate cable. Rather more these can at least regionally be guided in common cables from one safety related participant to the next. The termination element arranged at the end of the line and the change and/or conversion of the output signal received from the forward path carried out by the termination element into a test signal output to the return path in this connection serves the purpose of being able to recognize a cross-circuit between the forward path and the return path of the test signal path. The expectation with regard to which the safety unit checks the test signal received at the safety input is in this connection preferably configured in such a way that the satisfaction of the expectation presupposes the signal change and/or signal conversion carried out by the termination element and leads to a bridging of the termination element as a consequence of such a cross-circuit and leads to a violation of the expectation and in this way to an activation of the safety related function, for example, when, as a consequence of a cross-circuit, an incoming test signal is received which is unchanged with respect to the transmitted output signal. Thus, a high safety level is achieved for a low demand in cabling albeit the line topology and the in this connection inherent possibility of a cross-circuit between the forward path and the return path of the test signal path.

In accordance with an advantageous embodiment the safety system is adapted to additionally transmit data between the safety unit and the safety related participant or the safety related participants and/or a termination element as previously described besides the safety information transmitted via the test signal path. In this connection the safety unit can be configured to transmit data to the safety related participants and/or the safety related participants and/or the termination element can be configured to transmit data to the safety unit. In particular the safety related participant or the safety related participants can be adapted to transmit a message to the safety unit in the case of a discrepancy error of the respective safety related participant on the basis of which the safety unit can recognize the case of error and can preferably identify the erroneous safety related participant. Preferably, this communication of the safety unit enables the differentiation between a discrepancy error and an activation of the safety related function due to a non-secure state of a protective device for an error-free operation of the safety system.

The safety system preferably has a data path commonly used by the safety related participants and preferably also by the termination element, wherein preferably the safety related participants and possibly the termination element are connected in a row one after the other, for the reception and/or transmission of data to and from the data path and are connected to this. The data path can have a data forward path connected to an output of the safety unit for the transmission of outgoing data generated by the safety unit and/or can have a data return path connected to an input of the safety unit for the transmission of the data generated by the safety related participants and/or the termination element to the safety unit. Preferably, a data forward path and a data return path form a closed ring-shaped data path connected to an output and an input of the safety unit. In this connection both the data forward path as well as the data return path preferably run through the same safety related participants of the safety system in such a way that the safety related participants also form a line topology with respect to the ring shaped data path, wherein the termination element is arranged at the end of the line.

The data forward path can be formed by the forward path of the test signal path and can be identical to this, wherein the output signal transmitted by the safety unit to the forward path of the test signal path preferably comprises the output data of the safety unit transmitted to the safety related participants. In this way a separate data forward path can be omitted. The data return path is preferably configured as a separate signal path.

The safety system and its herein described safety related functions preferably satisfy the safety level SIL 3 in accordance with the norm IEC 61508 and/or the safety level performance level e ("PL e") in accordance with the norm EN ISO 13849-1. The safety input of the safety unit preferably comprises a secure input. The safety input is characterized by an error-safe evaluation of the incoming test signal in the safety unit for which purpose, for example, a two-channeled evaluation can take place which can e.g. be carried out by two parallel redundantly working microprocessors which control one another.

The invention also relates to a safety related participant and/or to an interconnection module for a safety related participant which is configured for use in a safety system as herein described and comprises an evaluation unit as herein described. The advantageous embodiments of the safety related participants and/or the interconnection modules described herein with reference to the safety system in accordance with the invention and in particular with reference to the evaluation unit and the corresponding advantages are correspondingly true.

The safety related participant in accordance with the invention comprises a protective device, a first and a second interruptible signal transmission path which can be interrupted in common on the occurrence of a non-secure state of the protective device, at least one test signal path which comprises at least one of the first and the second interruptible signal transmission paths and which is arranged between a test signal input and a test signal output of the protective device, and an interruption switch arranged in the test signal path. The safety related participant further comprises an evaluation unit which is connected to the first transmission path and/or to a first switching signal output of the protective device controlling the interruption of the first signal transmission path, which evaluation unit is connected to the second signal transmission path and/or to a second switching signal output of the protective device controlling the interruption of the first signal transmission path and which evaluation unit is adapted to check whether the first and the second signal transmission path are together interrupted or controlled for interruption and to open the interruption switch when the first and the second interruptible signal transmission path together are not interrupted or controlled for interruption.

The interconnection module in accordance with the invention comprises an interruptible and/or interrupted test signal path which is arranged between a test signal input and a test signal output of the interconnection module, two connections which are respectively configured either for the serial integration of an interruptible signal transmission path of a protective device comprising a forward line and a return line into the test signal path or for the connection to a switching signal line connectable to a switching signal output of a protective device and which connections are connected to a control input of an interruptible signal transmission path of the interconnection module arranged in the test signal path in such a way that the interruptible signal transmission path can be interrupted in dependence on a switching signal incoming at the connection. The interconnection module further comprises an interruption switch arranged in the test signal path and an evaluation unit which is connected to the two connections and which is adapted, on use of the interconnection module in the safety system, to check whether the controllable interruptible signal transmission paths respectively integrated into the test signal path via the two connections or controllable by means of a switching signal input connected to the connections are together interrupted or controlled for interruption and to open the interruption switch when the interruptible signal transmission paths together are not interrupted or controlled for interruption.

Figure 2:
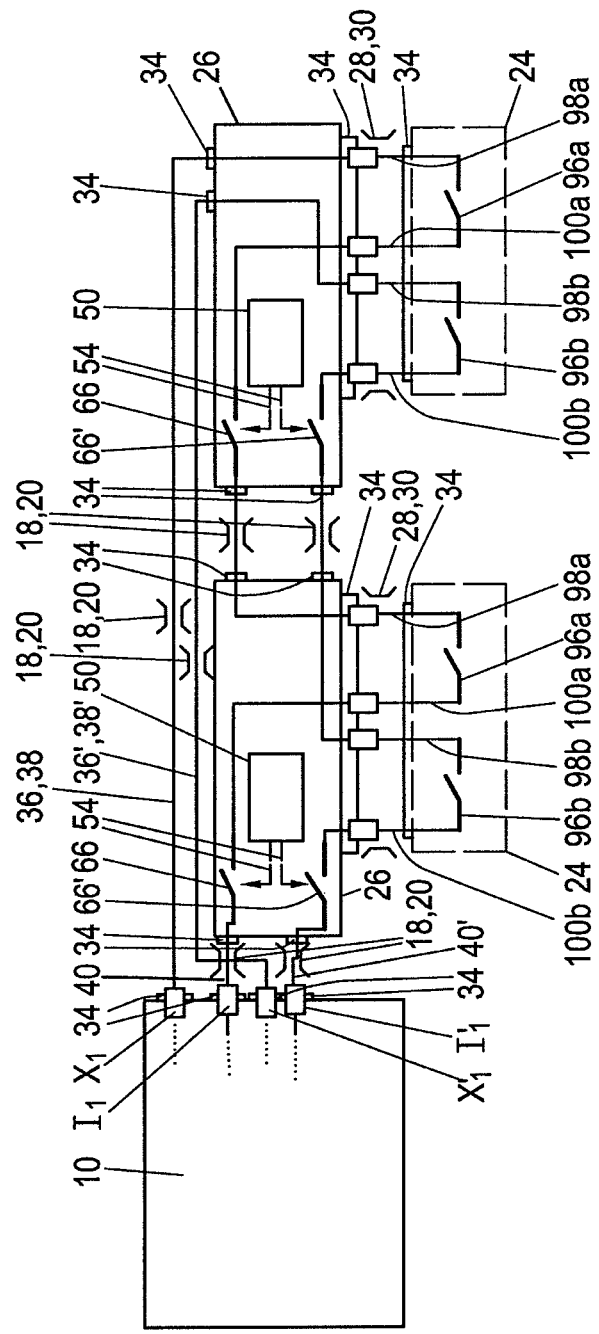
Figure 3:
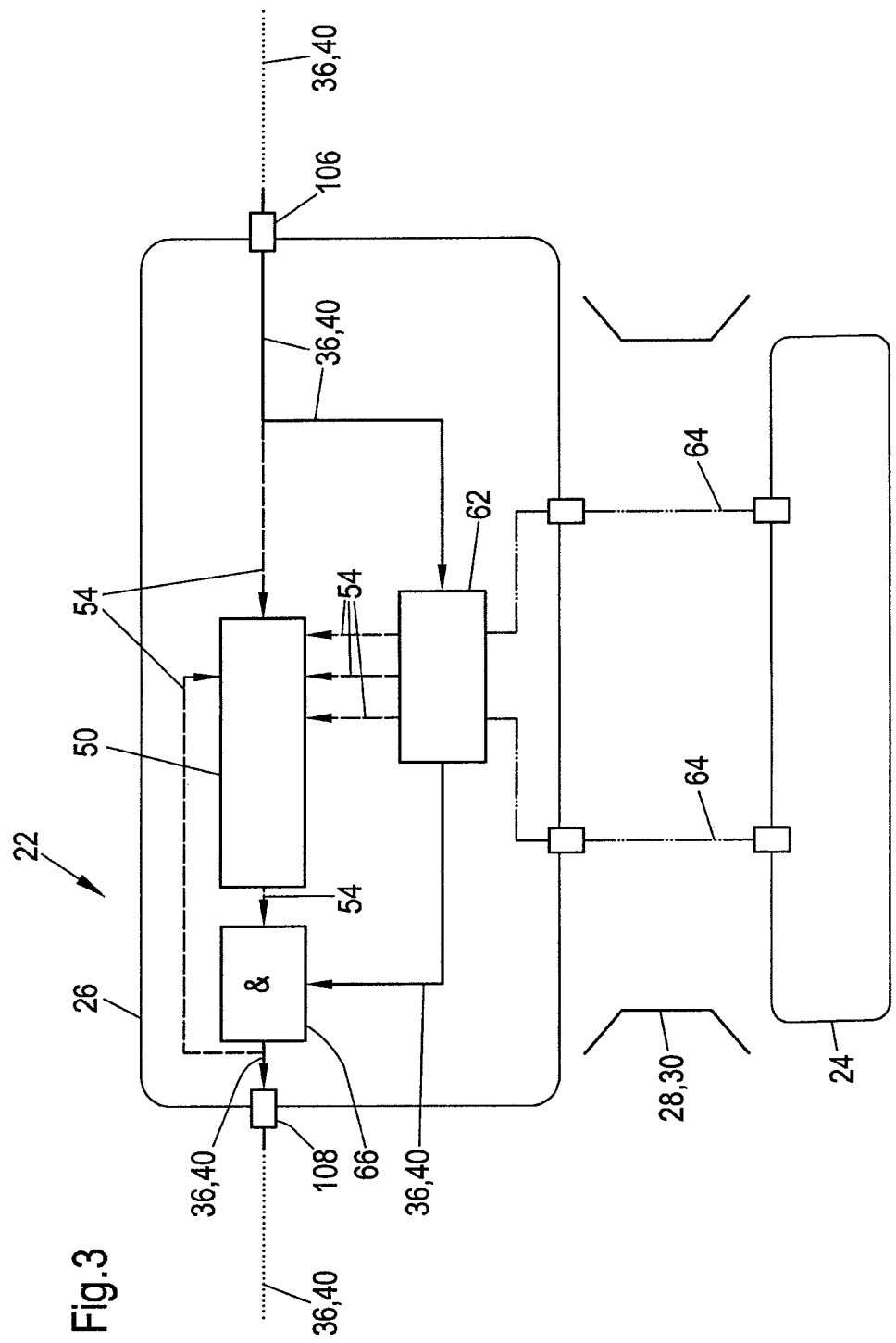
Figure 4:
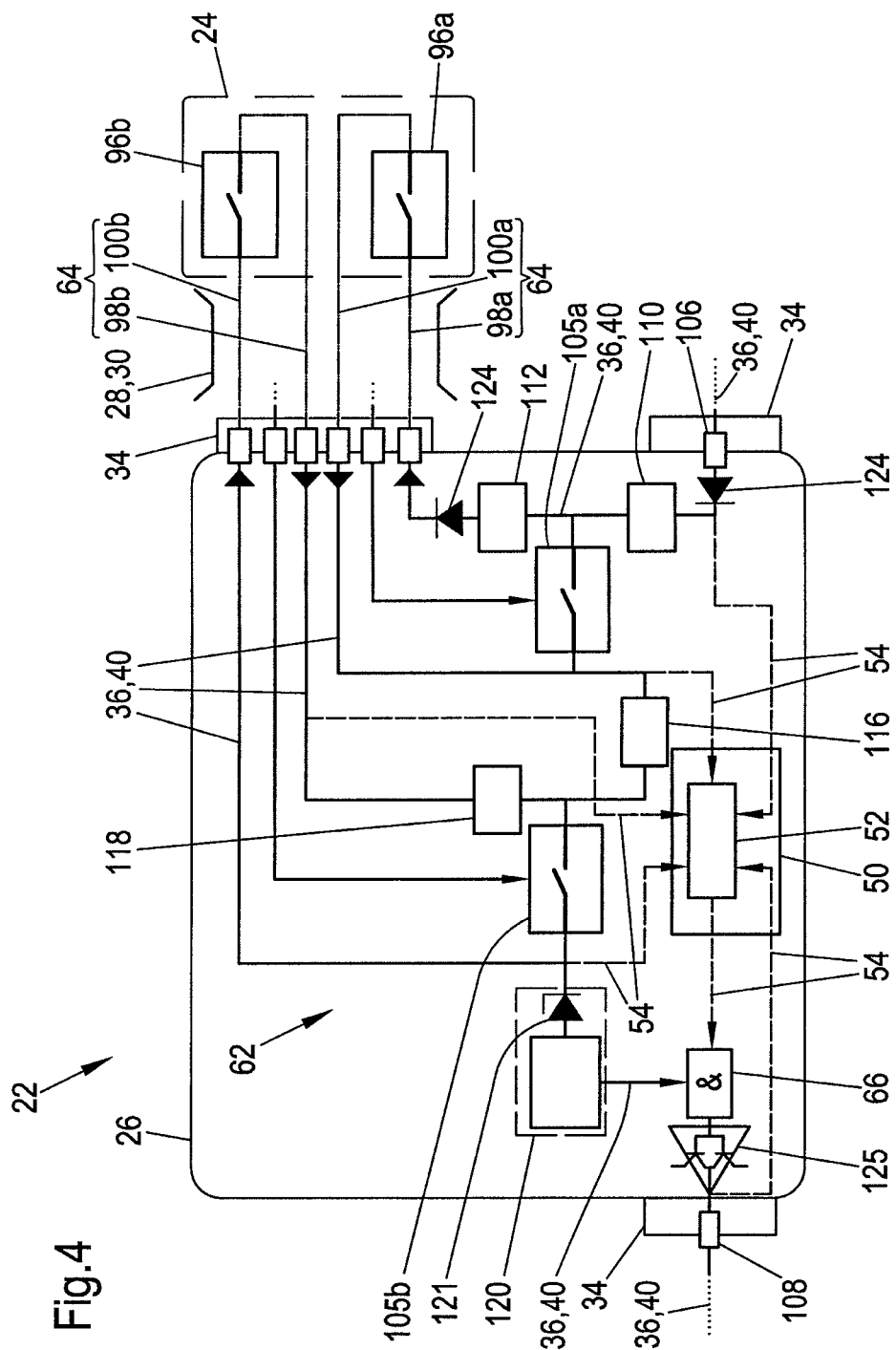
Figure 5:
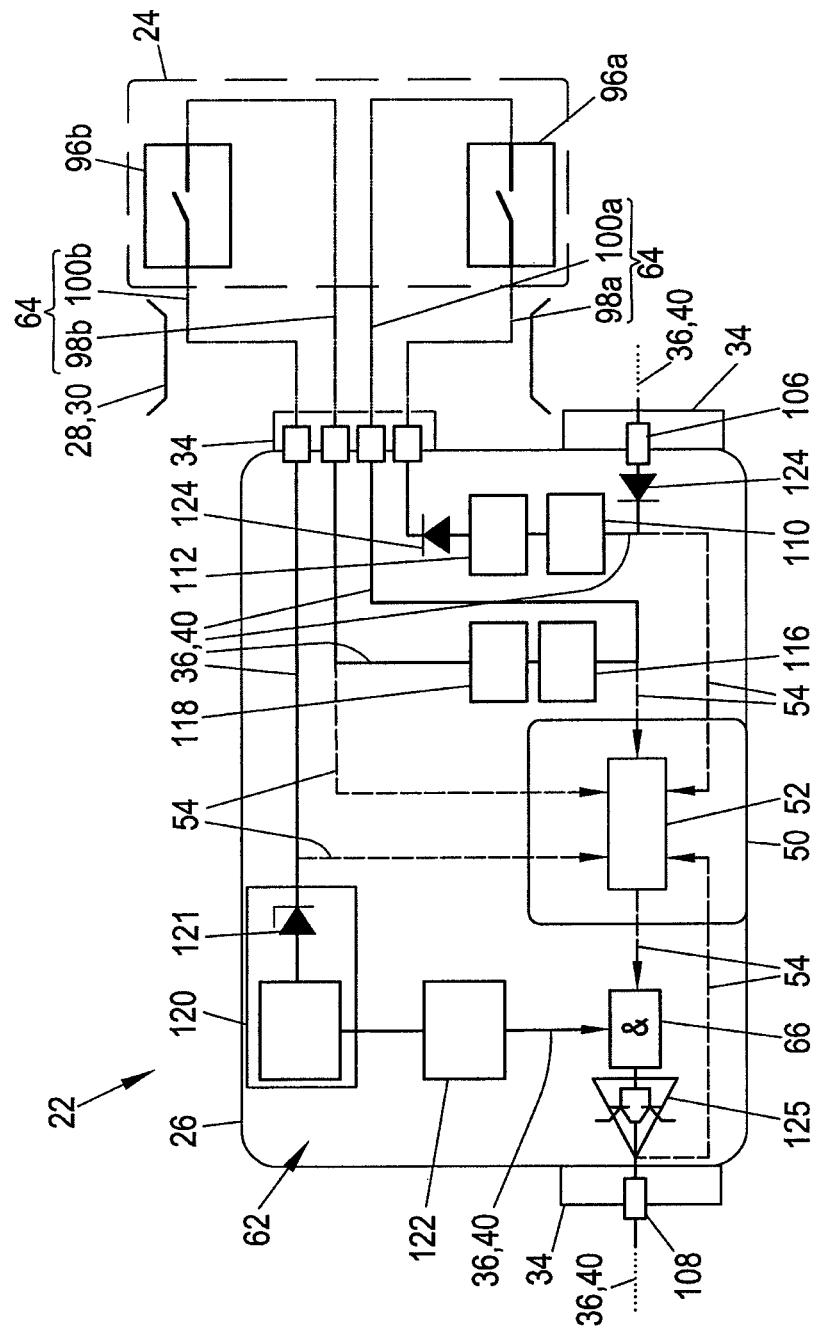
Figure 6:
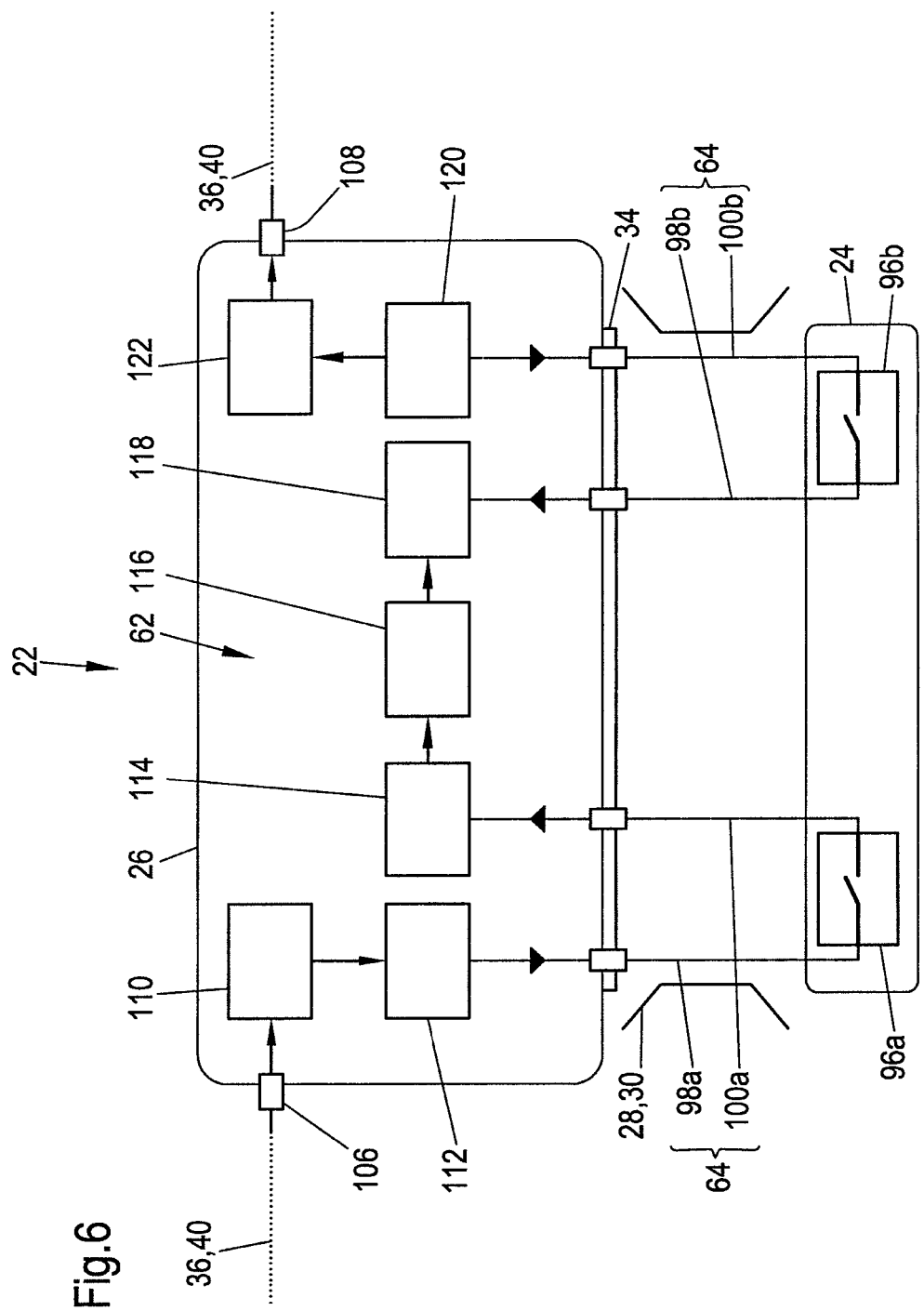
Figure 7:
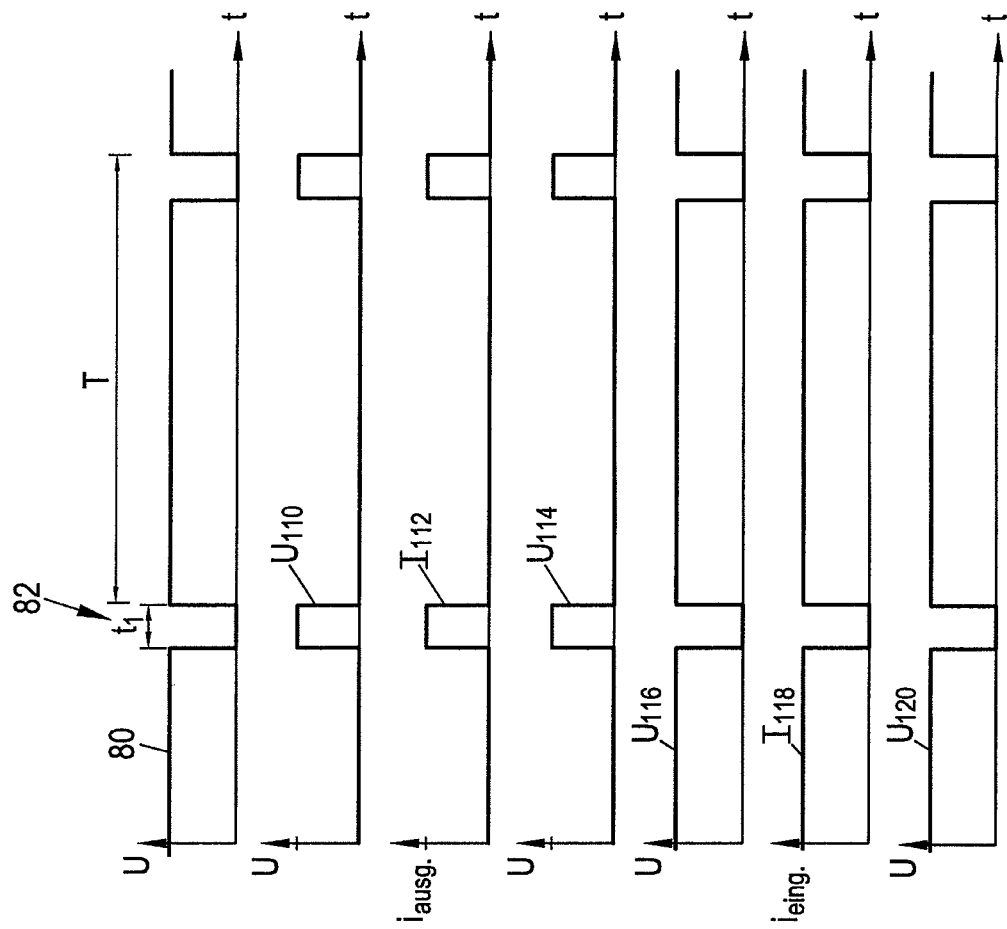
Figure 8:
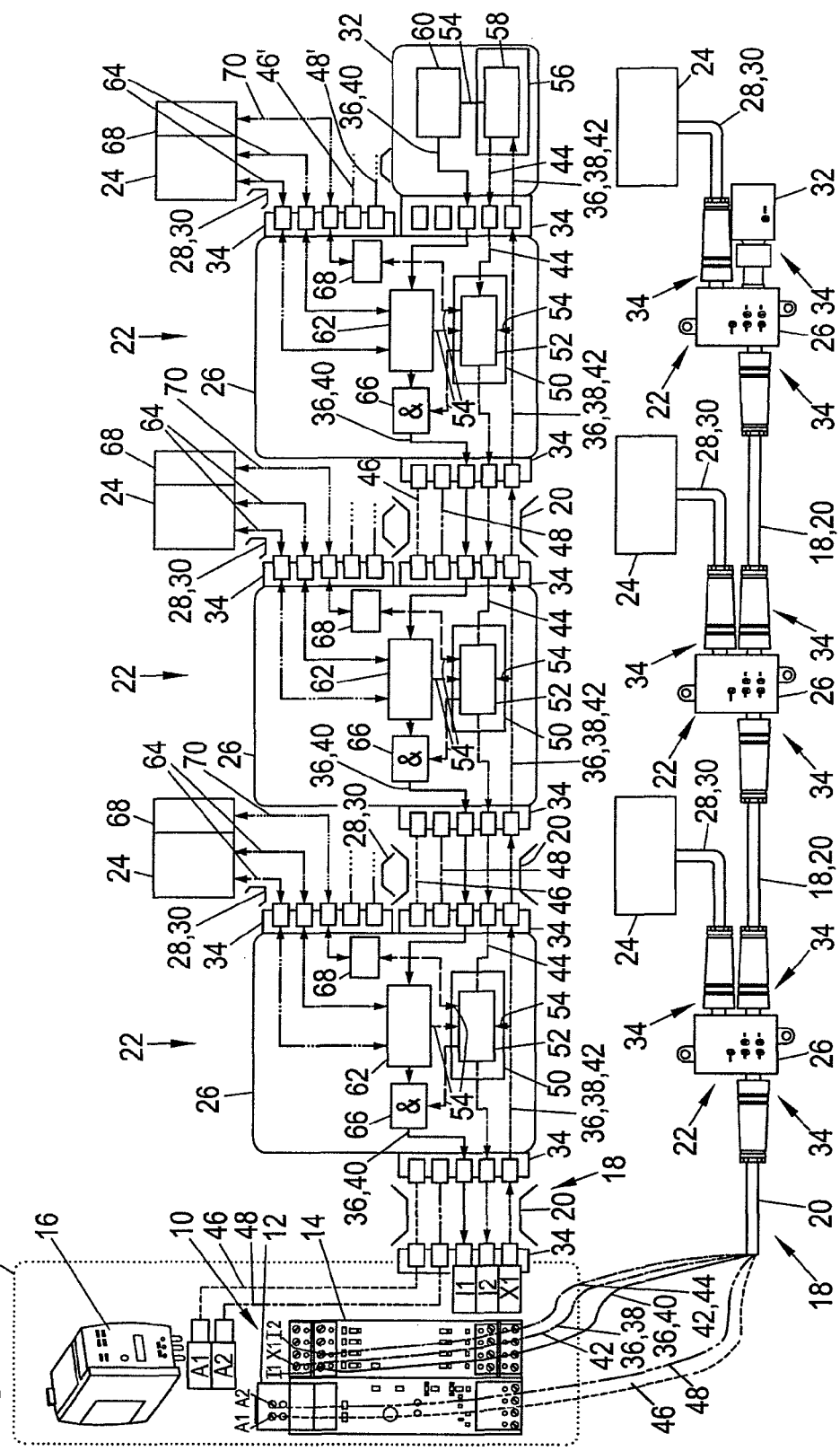

In the following the invention will be explained by way of example by means of an advantageous embodiment with reference to the submitted drawing. There is shown:

FIG. 1 a safety system in accordance with an embodiment of the invention in a schematic illustration;

FIG. 2 a safety system in accordance with a further embodiment of the invention;

FIG. 3 a safety related participant of a safety system in accordance with an embodiment of the invention;

FIG. 4 a safety related participant of a safety system in accordance with a further embodiment of the invention;

FIG. 5 a safety related participant of a safety system in accordance with a further embodiment of the invention;

FIG. 6 a safety related participant of a first safety system in accordance with a further embodiment of the invention;

FIG. 7 exemplary current signals and voltage signals transmitted by the test circuit of the safety related participant of FIG. 6; and FIG. 8 a safety system in accordance with a further embodiment of the invention.

FIG. 1 shows a safety system in accordance with a first embodiment of the invention. The safety system comprises a safety control 10 which can be arranged in a switching cabinet and which comprises an output X1 as well as a safety input I1.

The safety system comprises a test signal line and/or a bus line 18 having a plurality of cables and/or bus cables 20, wherein one of the cables 20 is connected to the output X1 and one of the cables 20 is connected to the input I1 of the safety control 10. The safety system further comprises a plurality of safety related participants 22 which are connected to the safety control 10 via the cables 20 of the bus line 18. The safety related participants 22 respectively comprise a protective device 24 and an interconnection module 26 which is connected to the respective protective device 24 via an interconnection line 30 formed by an interconnection cable 28 and which is directly connected to the respectively adjacent cables 20.

A cable is illustrated in the Figures in principle by two respective brackets facing one another which represent the jacket of the cable, wherein generally one of the brackets is provided with the corresponding reference numeral, this means the reference numeral 20 for a bus cable, and/or the reference numeral 28 for an interconnection cable. The one or more lines respectively drawn in between the brackets of a cable 20, 28 respectively represent an electrical line arranged in the respective cable jacket which can be composed of one or more electrical line conductors arranged in the cable jacket.

A protective device 24 can, for example, be configured as an emergency cutoff switch, as a locking apparatus of a safety door, as a light barrier, as a laser scanner or as a different secure protective device which is adapted to detect and/or to recognize a secure or a non-secure state at its plant.

The safety system is configured as a field bus system, this means that components of the safety system, in particular the safety related participants 22 are arranged locally distributed. The spacing between two different safety related participants 22 can in this connection be considerable and e.g. amount to one or more meters. The connection of the safety control 10, the protective devices 24 and the interconnection modules 26 to the bus cables 20 and to the interconnection cables 28 are exemplary respectively formed by an electrical plug connection 34 which is composed of a male plug of the one element, e.g. of the type M12 and a corresponding female plug of the other element. The protective device 24 and the interconnection modules 26 respectively have an own housing which is preferably configured in accordance with the housing protective type IP 67 or IP 20 or a different housing protective type protecting against contamination or humidity. The cables 20 and the interconnection cables 28 run outside of the housing and are formed as standard sensor/actor cables protecting against contamination or humidity which are suitable and allowable for the laying outside of housings, for example of the type M12, having a core cross-section and/or conductor cross-section of preferably at least 0.34 mm². The distances between the safety related participants 22 can e.g. amount to one or more meters and correspond to a length of a bus cable 20.

The bus line 18 and/or the respective conductors of the cables 20 of the bus line 18 and the safety related participants 22 connected to the bus line 18 form a ring-shaped test signal path 36 having a forward path 38 connected to the output X1 of the safety control 10 and a return path 40 connected to the safety input I1 of the safety control 10.

The interconnection module 26 of a safety related participant 22 respectively comprises an evaluation unit 50 which in the present embodiment comprises a microprocessor having an own time base and which can also be referred to as a logic unit. The evaluation unit 50 is connected to the control input of an interruptible switch 66 arranged in the test signal path 36 and included in this in a serial manner via a corresponding signal path 54 in such a way that the evaluation unit 50 can control the interruption switch 66 in dependence on a check explained in the following in order to interrupt the interruption switch 66 and in this way the test signal path 36.

The protective devices 24 of the safety related participants 22 are configured as two-channeled protective devices, this means protective devices 24 respectively having two protective channels which each comprise two equivalently switching electrical switches 96a, 96b interrupted together in the non-secure state of the protective device 24 which each form a protective channel of the protective device 24. Specifically, such a protective device 24 can, for example, be a two-channeled emergency cutoff switch whose switches 96a, 96b are closed in the secure state of the emergency cutoff switch, this means the non-actuated state of the emergency cutoff switch and whose switches 96a, 96b are open in the non-secure state of the emergency cutoff switch, this means the actuated state of the emergency cutoff switch. Likewise, it can be a locking apparatus of a safety door, wherein the switches 96a, 96b are closed in the secure state of the safety door, this means for a locked safety door and the switches 96a, 96b are open in the non-secure state, this means for an open safety door.

The switches 96a, 96b are respectively connected to the interconnection module 26 via a forward line 98a and/or 98b or a return line 100a and/or 100b of the interconnection cable 28, wherein each switch 96a, 96b having the associated forward and return line 98a, 98b, 100a, 100b respectively forms an interruptible signal transmission path of the safety related participant 22. As is shown in FIG. 1, the interruptible signal transmission paths having the switches 96a, 96b are respectively connected in series to the test signal path 36 via the respective interconnection module 26 and are connected to one another electrically in series.

The evaluation unit 50 of each safety related participant 22 is connected to the forward lines 98a, 98b and the return lines 100a, 100b of the two interruptible signal transmission paths of the safety related participants 22 via signal paths not explicitly illustrated in FIG. 1 and is adapted to query the switching states of the two switches 96a, 96b via these signal paths independent of one another. The evaluation unit 50 monitors the switching states of the two switches 96a, 96b with regard to a discrepancy, this means switching states deviating from one another. The evaluation unit 50, in particular checks whether the two switches 96a, 96b are simultaneously interrupted apart from a predefined allowable discrepancy time on the occurrence of a non-secure state of the protective device 24. When this is not the case, the evaluation unit 50 opens the interruption switch 66 and thereby interrupts the test signal path 36.

During the operation of the safety system shown in FIG. 1 the safety control 10 generates a dynamic output signal and/or test signal and transmits this via the output X1 to the test signal path 36. This output signal and/or test signal is preferably a dynamic signal, this means a signal variable in time. The output signal can be a binary signal, for example, a binary signal based on an electrical voltage which alternates between a high voltage level of e.g. 24 V and a low voltage level of, for example, 0 V or ground potential. The output signal can, for example, have periodically arising test gaps having a predefined cycling time and having a predefined duration, wherein the signal respectively continuously has a low signal level during the test gaps and a continuously high signal level between two test gaps following one another.

The safety control 10 is configured to receive the test signal incoming at its safety input I1 to compare this to an expectation configured in the safety control 10 and in the case of a violation of the expectation to trigger a safety related cutoff of the plant monitored by the safety related participants 22. In the present embodiment the safety control 10 expects an incoming test signal at the safety input I1 substantially unchanged with respect to the output signal transmitted at the output X1 from the safety control 10. In this connection the safety control 10 can check the incoming signal, for example, with regard to the presence of test gaps of the expected duration arising in synchronization to the transmitted signal.

In the secure state of all protective devices 24 and in the error-free state of the safety system, the switches 96a, 96b of the protective devices 24 and the interruption switch 66 are closed in such a way that the output signal transmitted by the safety control 10 arrives at the safety input I1 of the safety control 10 via the test signal path 36 and satisfies the expectation of the safety control 10.

Due to the series switching of the switches 96a, 96b in the test signal path 36, the test signal path 36 is interrupted when at least one of the switches 96a, 96b is opened due to the occurrence of a non-secure state of a protective device 24. In this case the output signal is not transmitted to the safety input I1 in such a way that the expectation of the safety control 10 is violated and a safety related cutoff is carried out.

A discrepancy error of a safety related participant 22, this means a non-simultaneous opening of both switches 96a, 96b, for example, due to a fused switch 96a, 96b additionally leads to the associated evaluation unit 50 opening the interruption switch 66 and the test signal path 36 thereby likewise being interrupted. Thereby a cutoff of the plant can be caused and a restart of the plant can be prevented, since a restart of the plant is only allowed by the safety control 10 following a safety related cutoff when the expected signal transmission is possible again. The evaluation unit 50 can open the interruption switch 66 at least for so long and thereby prevent a restart of the plant up until a discrepancy error recognized by the evaluation unit 50 has been corrected, for example, by means of an exchange of the associated protective device 24. It can thereby be prevented that such a discrepancy error remains undetected and tolerated by the safety control 10 and that a restart of the plant takes place without a correaction of the error state.

FIG. 2 shows a safety system in accordance with a further embodiment which apart from the differences discussed in the following substantially corresponds to the safety system shown in FIG. 1.

The safety system shown in FIG. 2 comprises a safety control 10 having two separate test signal paths 36, 36' which are respectively arranged in a ring-shaped manner between an output X1, X1' and a safety input I1, I1' of the safety control 10 and which respectively extends through both safety related participants 22.

In this connection the interruptible signal transmission path associated with each safety related participant 22 and belonging to a switch 96a is arranged in the one test signal path 36 and the other interruptible signal transmission path belonging to the other switch 96b is arranged in the other test signal path 36' in such a way that the switches 96a of the two safety related participants 22 are electrically connected in series in the test signal path 36 and the switches 96b of the two safety related participants 22 are electrically connected in series in the test signal path 36'.

Each safety related participant 22 has two interruption switches 66, 66' which are respectively arranged in one of the two test signal paths 36, 36' and via which a respective signal path 54 is connected to the evaluation unit 50, wherein the evaluation unit 50 is adapted to interrupt at least one of and preferably both interruption switches 66, 66' on a discrepancy error, this means for a non-common switching of the switches 96a, 96b of a protective device 24. The evaluation unit 50 in this connection opens the interruption switch 66, 66' in the case of a discrepancy error for so long until the error has been corrected. In this connection an erroneous error acknowledgement is prevented and a restart of the plant is prevented until the interruption switches 66, 66' are closed again. In particular, no erroneous error acknowledgement can take place by means of the safety control 10 when both protective devices 24 have been brought into the non-secure state and subsequently into the secure state by a user following an activation of the safety related function and during the presence of a discrepancy error, since each evaluation unit 50 specifically monitors the interruptible signal transmission path of the associated safety related participant 22 with regard to a discrepancy and a logical compensation through an error-free switching operation of a different safety related participant 22 is excluded. Naturally, the system shown in FIGS. 1 and 2 can also comprise more than two safety related participants 22 which are incorporated into the system in the illustrated manner.

FIG. 3 shows a safety related participant 22 for use in a safety system in accordance with the invention which can, for example, correspond to the safety system shown in FIG. 1 or FIG. 2. FIG. 3 shows a safety related participant 22 having a two-channeled protective device 24, this means a protective device 24 having two protective channels. Each protective channel of the protective device 24 is associated with one of two interruptible signal transmission paths of the safety related participant 22 and/or of the protective device 24 arranged in the return path 40 of the test signal path, the channels not being individually illustrated in FIG. 3 and being able to be interrupted together on the occurrence of a non-secure state of the protective device 24. The interruptible signal transmission paths are preferably electrically connected in a row between a test signal input 106 and a test signal output 108 of the safety related participants 22, this means they are switched in series.

Each protective channel of the protective device 24 is connected to the test signal path 36 via a connection 64 of the interconnection line 30. In the present embodiment the interconnection module 26 comprises a test circuit 62 to be described in the following in more detail which forms a section of the test signal path 36, wherein the protective channels of the protective device 24 are connected in the region of the test circuit to the test signal path 36 via the connections 64. As was previously described with reference to FIGS. 1 and 2 and the safety related participants 22 shown there a connection 64, can, for example, be formed by a forward line 98a, 98b and a return line 100a, 100b, as shown in FIGS. 1 and 2, between which an interruptible electrical switch arranged in the protective device 24 is arranged, wherein in principle also an interruptible optical signal transmission path can be arranged there. Likewise the connection 64 can preferably comprise a single conductor and/or a single channeled switching signal line connected to a switching signal output, e.g. a digital switching signal output, such as, for example, an OSSD output, wherein an interruptible signal transmission path arranged in the safety related participant 22 and/or in the test circuit 62 is controlled by the switching signal output in order to open and to close this in dependence on the secure or the non-secure state of the protective device 24. The reference numeral 64 in FIG. 3 thus generally describes a connection between a protective channel of the protective device 24 and the interconnection module 26 which can specifically be formed to a switch of the protective device 24 e.g. by a forward line and a return line or by a switching signal line.

The evaluation unit 50 is connected to the interruptible signal transmission paths and/or the connections 64 via a plurality of signal paths 54, in order to determine whether the first and the second interruptible signal transmission path were interrupted together or were controlled together for interruption when a non-secure state of the protective device 24 arises. For this purpose the logic unit 50 can check whether the two interruptible signal transmission paths were simultaneously interrupted, possibly apart from a certain predefined tolerance in time. When a protective channel of the protective device 24 comprises a switching signal output, as previously described, by means of which an interruptible signal transmission path is controlled, then the logic unit 50 can be connected to the corresponding switching signal output via the connection 64. Rather than checking whether the respective interruptible signal transmission path is actually interrupted, the logic unit 50 can then check whether the interruptible signal transmission path is controlled for interruption. The logic unit 50 controls the interruption switch 66 via a signal path 54 arranged between the evaluation unit 50 and the interruption switch 66 in order to open this when the two interruptible signal transmission paths are not commonly interrupted or have been controlled for interruption.

The evaluation unit 50 can also be adapted to recognize a line error of one or more connection lines 64, such as, for example, a cross-circuit between different connection lines 64 and/or a short circuit between a forward line and a return line of the same connection line 64.

As is likewise shown in FIG. 3 the evaluation unit is also connected to the test signal output 108 via a further signal path 54 in such a way that the evaluation unit 50 can also monitor the test signal output via the test signal output 108. The evaluation unit 50 can thus also monitor the outgoing test signal of the safety related participant 22 in addition to or in the framework of the previously described discrepancy monitoring and can possibly bring about an interruption of the interruption switch 66 in dependence on this monitoring.

FIG. 4 shows a further embodiment of a safety related participant 22 for use in a safety system as is shown in FIG. 1 and FIG. 2 having an evaluation unit 50 which checks the protective channels of the protective device 24 with regard to a discrepancy. FIG. 4 additionally shows the components of a test circuit 62 of the safety related participant 22 as is shown in FIG. 3 and is described in the following in detail with reference to FIG. 6 and FIG. 7.

The interruptible signal transmission paths of the safety related participant 22 shown in FIG. 4 are formed by switches 96a, 96b of the protective device 24 as is the case for the safety related participants of FIG. 1 and FIG. 2. The switches 96a, 96b are respectively connected to the interconnection module 26 via a forward line 98a, 98b and a return line 100a, 100b of the interconnection line 30 and are electrically connected to one another in series via a test circuit 62, as is described in the following in connection with the FIG. 6 in detail. The evaluation unit 50, whose microprocessor 52 is likewise shown in FIG. 4, is connected to the two forward lines 98a, 98b and return lines 100a, 100b via corresponding signal paths 64. The evaluation unit 50 is configured to detect the switching state of the two switches 96a, 96b via the signal paths 54a and to check whether the two switches 96a, 96b are interrupted together in the case of an occurrence of a non-secure state of the protective device 24 and in order to control and to interrupt the interruption switch 66 via a further signal path 54 when a discrepancy of the two switches 96a, 96b is recognized, this means when the two switches 96a, 96b are not interrupted together.

The interconnection module 26 shown in FIG. 4 can be used both with a protective device 24 having electrical switches 96a, 96b as shown in FIG. 4 and also alternatively with a non-illustrated protective device having digital switching signal outputs or with a protective device 24 having a combination of the two.

The interconnection module 62 shown in FIG. 4 respectively its test circuit 62 for this purpose has two further electrical or electronically controllable switches 105a, 105b arranged in the test signal path 36 besides the connections provided for the connections 64 to the switches 96a, 96b via the interconnection line 30 which controllable switches can, for example, comprise field effect transistors or bipolar transistors and which can be controlled in dependence on a switching signal of a corresponding switching signal output of a protective device 24 and can, in particular on the occurrence of a non-secure state of the protective device 24, be opened to interrupt the test signal path 36. The switches 105a, 105b thus represent signal transmission paths which are normally closed on the connection of corresponding switching signal outputs of the protective device 24 and/or which are maintained in the closed state by the constantly transmitted switching signals of the protective device 24 and which together are interruptible on the occurrence of a non-secure state of the protective device 24. For this purpose the interconnection module 26 has connections via which the control inputs of the electrical or electronically controllable switches 105a, 105b can be respectively connected to a corresponding switching signal output of the protective device 24 and/or a switching signal line of the interconnection line 30, preferably a single conductor switching signal line of the interconnection line 30. If a protective device 24 is connected to the switches 105a, 105b without corresponding switching signal outputs, as is shown in FIG. 4, this means that if the switching signal is not applied at the control inputs of the switches 105a, 105b, then the switches 105a, 105b are continuously opened.

FIGS. 4 and 5 moreover show the individual components of the test circuit 62 which will be described in the following in more detail with reference to FIG. 6 and which comprises a first inverter 110, a controlled current source 112, a second inverter 116, a controlled current sink 118, a current direction element 120 having a Zener diode 121, a dynamic unit 122 (FIG. 5) and two diodes 124. Moreover, a signal amplifier or a signal driver 125 is shown which is arranged between the interruption switch 66 and the test signal output 108 and which outputs the test signal in a signal driving manner to the subsequent sections of the return path 40.

FIG. 6 shows a safety related participant 22 which substantially corresponds to the safety related participant 22 shown in FIGS. 4 and 5 having the test circuit 62 which serves for the recognition of a cross-circuit or of a different error in the interconnection line 30. The evaluation unit, the interruption switch and the corresponding signal path provided for the discrepancy check are not shown in FIG. 6 for reasons of better clarity.

The dynamic signal 80 (FIG. 7) transmitted via the return path 40 of the test signal path 36 is received at the test signal input 106 of the interconnection module 26. As was described in the foregoing it is preferably a voltage-based signal, in particular a binary direct voltage signal having test gaps 82 of a predefined constant duration at periodic intervals, during which the test signal 80 constantly has a low voltage level and between which the test signal continuously has a high voltage level.

The test signal input 106 is connected to the input of an inverter 110 which receives and inverts the incoming test signal and outputs an inverted test signal, preferably a likewise voltage-based test signal, at its output. On the inversion a high signal level and/or voltage level of the incoming signal is converted into a low signal level and/or voltage level of the outgoing signal and a low signal level and/or voltage level of the incoming signal is converted into a high signal level and/or voltage level of the outgoing signal. A diode 124 can likewise be arranged between the test signal input 106 and the input of the inverter 110, as shown in FIGS. 4 and 5, the diode 124 being polarized in the positive signal flow direction of the test signal and preventing a positive current flow from the safety related participant 22 to the upstream section of the return path 40 of the test signal path 36. This diode 124 is, however, not necessarily required.

The output of the inverter 110 is connected to the control input of the controlled current source 112 which is configured to convert the direct voltage signal provided by the inverter 110 into a direct current signal in such a manner that a high level of the direct voltage signal provided by the inverter 110 corresponds to a high level of the direct current signal and a low level of the direct voltage signal provided by the inverter 110 corresponds to a low level of the direct current signal. The controlled current source 112 is configured as an active current source and is adapted to actively generate a positive outgoing electric current flow with respect to the technical current flow direction which, as previously described, depends on the applied control signal. As is shown in FIG. 4 and FIG. 5 a diode 124 can be arranged between the output of the controlled current source 112 and the forward line 98a which is polarized in the direction of the outgoing current of the current source 112 which prevents a current flow from entering into the current source 112. An incoming current flow into the current source 112 can in principle be prevented in an arbitrary manner, for example, in that the current source 112 is itself configured in such a way that such a current is avoided. Likewise a similar blocking element can be provided instead of the diode 124 which prevents a current from entering into the current source 112.

The current signal generated by the controlled current source 112 is transmitted to a current flow element 114 of the test circuit 62 via the first electrical switching path, this means via the forward line 98a, the switch 96a, which is closed in the secure state of the protective device 24 and via the return line 100a. The current flow element 114 is an electrical load and/or a passive electrical element or component and is configured to receive a current signal transmitted via the return line 100a at its input and to output a direct voltage signal at its output which depends on the received current signal and indeed in the present embodiment in such a way that a high current level of the incoming current signal corresponds to a high voltage level of the outgoing voltage signal and a low current level of the incoming current signal corresponds to a low voltage level of the outgoing voltage signal.

The voltage signal generated by the current flow element 114 is transmitted to the second inverter 116 which receives and inverts the signal and outputs an inverted signal at its output, wherein, during the inversion, a high signal level and/or voltage level of the incoming signal is converted into a low signal level and/or voltage level of the outgoing signal and a low signal level and/or voltage level of the incoming signal is converted into a high signal level and/or voltage level of the outgoing signal.

The output of the inverter 116 is connected to a control input of the controlled current sink 118 which is configured to convert the direct voltage signal provided by the inverter 116 into a direct current signal in such a way that a high level of the direct voltage signal provided by the inverter 116 corresponds to a high level of the direct current signal and that a low level of the direct voltage signal provided by the inverter 116 corresponds to a low level of the direct voltage signal. The controlled current sink 118 is configured as an active current sink and is adapted to generate an electric current flow at its output which is a positive incoming electric current flow, this means a negative outgoing current flow with respect to the technical flow direction which depends on the applied control signal in the previously described manner.

The direct current signal generated by the controlled current sink 118 is transmitted to the current direction element 120 via the second electrical switching path, this means via the forward line 98b, the switch 96b, which is closed in the secure state of the protective device 24 and via the return line 100b. As becomes obvious at this point, the description of the lines 98b, 100b as "forward" line and/or "return" line is not related to the technical current flow direction, but rather to the signal flow direction which in the case of the switch 96b is opposite to the technical current flow direction, since the current sink 118 generates and transmits a current signal defined by an incoming current.

The current direction element 120 is configured to output a direct voltage signal at its output which is dependent on the received direct current signal. The current direction element 120 generates a voltage signal corresponding to the received current signal, as long as the value of the current signal transmitted via the second switching path received by the current direction element 120 and defined by an outgoing current of the current direction element 120 changes between an expected low level of, e.g. 0 mA, and an expected high level of, e.g. 10 mA. In this case the current direction element 120 preferably generates a direct voltage signal at its output which corresponds to the current signal received at its input, this means that a high outgoing current level of the current signal corresponds to a high voltage level of the voltage signal and a low outgoing current level of the current signal corresponds to a low level of the voltage signal.

The current direction element 120 is further adapted recognize when—in contrast to the expectation for an error-free operation—an incoming current flow is present at the current direction element 120 and/or to recognize when an outgoing current flow is indeed present at the current direction element 120 whose level, however, does not correspond to an expected level during an error-free operation of the safety related participant 22 at least for a certain period of time, this means that in the present case neither the high level expected for an error-free operation nor the low level expected for an error-free operation of the current signal transmitted via the second electrical switching path. For example, an error can be assumed when the value of the outgoing current at the current direction element 120 lies beneath the expected high level of the current signal of the current sink 118 and above the expected low level of the current signal from the current sink 118. In the aforementioned cases the current direction element 120 preferably generates a voltage signal at its output which leads to a violation of the expectation of the safety control, possibly in cooperation with the dynamic unit 122 explained in the following. The current direction element 120, for example, generates a voltage signal having a level which continuously and/or at least for a complete test cycle duration, this means the duration from the start of a test gap up to the expected beginning of the next test gap of the test signal expected by the safety control, takes on a substantially constant value.

The current direction element 120 can be configured as an electrical load and/or as a passive electrical element and/or component. The current direction element 120 can comprise a Zener diode 121, as is shown in FIG. 4 and FIG. 5, which is polarized in the direction of the current outflowing from the current direction element 120, with the Zener diode 121, however, not necessarily being required. The Zener diode 121 can be present in its pass band for an expected high level of the current flowing out of the current direction element 120, during which current flow a voltage is applied at the Zener diode 121 which lies in the region of a pass band voltage of the Zener diode 121. The Zener diode can be present in a blocking band region for a current flowing out of the current direction element 120 which is reduced with respect to the expected current and the voltage of this current, which is applied to the Zener diode, is reduced with respect to the pass band voltage of the Zener diode 121.

A dynamic unit 122, as shown in FIG. 6, can be provided in addition to the previous components which receives the voltage signal generated by the current direction element 120 at its input and is adapted to forward the received signal in a substantially unchanged manner when the received signal has the expected dynamic, this means, in particular has regularly arising test gaps. When the received signal does not have the expected dynamic, the dynamic unit outputs a signal having a substantially constant level. In this connection, the dynamic unit images both a constant high level of its input signal and also of a constant low level of its input signal with respect to the same high or low level onto its output signal. The unified imaging of both a constant high level and also of a constant low level onto the same level leads to a reduction of state which simplifies the differentiation at the safety control between a case of switch off, this means the presence of a non-secure state of one of the safety related participants from a system error on the basis of an incoming test signal.

In the following the functional principal of the test circuit 62 will be explained with reference to the FIG. 6 and FIG. 7, wherein FIG. 7 shows the current and voltage signals which are respectively present between the sections of the test signal path 36 arranged between the components of the test circuit 62 for an error-free function of the safety related participants 22 and in the secure state of the protective device 24 in which the two switches 96a, 96b are closed. The test signal 80 is shown at the top of FIG. 7 which is based on the electric voltage U input at the test signal input 106 as it is made available at the output X1 by the safety control 10. The inverter 110 generates a voltage signal $U_{110}$ inverted with respect to the received test signal 80, this means a voltage signal $U_{110}$ having a low voltage level during the high signal level of the incoming test signal 80 and a high voltage level in the shape of a test pulse during the test gap 82 of the received test signal 80 as is shown in FIG. 7. The controlled current source 112 generates a current signal $I_{112}$ formed by a current $i_{out}$ outgoing from the current source 112 therefrom having a substantially identical shape with respect to the voltage signal $U_{110}$, this means a current pulse having a high outgoing current level during the test gap 82 of the received test signal 80 and a low current level between two current pulses.

This current signal $I_{112}$ is transmitted to the current flow element 114 which generates a voltage signal $U_{114}$ from the transmitted current signal $I_{112}$ which is identical in its shape with respect to the voltage signal $U_{110}$ generated by the inverter 110. The voltage signal $U_{114}$ generated by the current flow element 114 is inverted by the inverter 116 in such a way that this makes available a voltage signal $U_{116}$ at its output and transmits this to the controlled current sink 118 which signal is identical in its shape with respect to the test signal 80 received at the test signal input 106. From this the current sink 118 generates a current signal $I_{118}$ formed by an incoming electric current $i_{in}$ of the current sink 118 which is identical in its shape with respect to the voltage signal $U_{116}$ provided by the inverter 116 and which is transmitted to the current direction element 120 via the switch 96b which current direction element generates a voltage signal $U_{120}$ therefrom which is identical in its shape with respect to the current signal $I_{118}$ provided by the current sink 118 and consequently is identical with respect to the test signal 80 incoming at the test signal input 106. The dynamic unit 122 forwards the signal $U_{120}$ substantially unchanged when the signal $U_{120}$ has the expected dynamic. Otherwise the dynamic unit 122 outputs a signal having a substantially constant level. The output signal of the dynamic unit 122 is made available at the test signal output 108 of the safety related participant 22.

Thus, a test signal is made available at the test signal output 108 for an intact safety related element 22 and in the secure state of the protective device 24 which test signal is identical with respect to the test signal received at the test signal input 106 with respect to the properties to be checked by the safety control 10, in particular the signal shape and the signal synchronization in such a way that the expectation of the safety control is satisfied.

If at least one of the switches 96a, 96b of the protective device 24 is opened on the occurrence of a non-secure state of the protective device 24, then the current flow element 114 and/or the current direction element 116 is/are no longer excited by the incoming test signal 80 which leads to a loss of the dynamic of the test signal output at the output 108 and thus reliably leads to a safety related cutoff by the safety control. The same effect is brought about by a line interruption of a forward line 98a, 98b or of a return line 100a, 100b in the interconnection line 30 in such a way that also in this case of error a reliable safety related cutoff takes place. In the case of an interruption of the forward line 98a or of the return line 100a a constant high level is present at the output of the inverter 116 such that a permanent control of the current sink 118 takes place and thus a constant incoming current flow is present at the output of the current sink 118 without the expected signal dynamics. In the case of an interruption of the forward line 98b or of the return line 100b no constant output current is generated at the current direction element 120 such that its output signal $U_{120}$ takes on a constant low level without the expected signal dynamics.

Moreover, the test circuit 62 also has the effect that a cross-circuit between the two switching paths is recognized, this means a cross-circuit between the forward line 98a and/or the return line 100a of one electrical circuit path with the forward line 98b and/or the return line 100b of the other electrical circuit path and leads to a safety related cutoff. In the case of such a cross-circuit the second switching path is directly connected to a current source 112, which in the case of a signal having a high level at its control input drives an outgoing current flow. The current source 112 thus counteracts an outgoing current flow at the current direction element 120 in such a way that an incoming current flow is at least partly intermittently set at the current direction element 120 or at least a current flow having a level present at least for a certain period of time which is different from an expected level of the current signal $I_{118}$ expected on an error-free operation and which, for example, lies beneath the expected high level and simultaneously above the expected low level of e.g. 0 mA. The current direction element 120 is configured to recognize such a deviation from the error-free operation on the basis of the current flow through the current direction element 120 and to generate a voltage signal $U_{120}$ at its output in this case, which output signal preferably has a continuously constant voltage level and which leads to a test signal violating the expectation of the safety control at the test signal output 108. Thus, also this case of error can be reliably recognized and can thus not lead to a loss of the safety related function, the case of error being due to the parallel guidance of the forward lines 98a, 98b and the return lines 100a, 100b of both electrical switching paths in a common interconnection cable 28.

In this respect the test circuit 62 is excited purely by the test signal received at the input 106 and the dynamic of the test signal output at the output 108 is purely generated by the dynamic of this incoming test signal. The test circuit 62 thus completely does without an own time base and, in particular without an own clock generator and the herein described components of the test circuit 62 can all be formed by discrete components, this means that one can do without the use of an integrated circuit, such as, e.g. a microprocessor. The reliability and error safety of the test circuit 62 is considerably increased thereby. Moreover, a delay between the test signal incoming at the test signal input 106 and the test signal outgoing at the test signal output 108 is as far as possible avoided and the reaction time of the safety system is optimized totally.

In the previously described embodiment of a test circuit 62 the inverter 110 and the non-inverting controlled current source 112 together form an inverting controlled current source and the inverter 116 and the non-inverting controlled current sink 118 together form an inverting controlled current sink. Instead of this assembly of the controlled inverting current source and/or current sink from separate components, namely from the inverter 110, 116 and the controlled non-inverting current source 112 and/or current sink 118, also a respective one part controlled inverting current source and/or current sink can be used, this means a controlled current source and/or a current sink which for a high level of the control signal, generate an outgoing and/or an incoming current having a low level and for a low level of the control signal generate an outgoing and/or an incoming current having a high level. Likewise one can in principle do without the current flow element 114 and/or its function which can be integrated into the inverter 116 or into an inverting controlled current sink, in that a current controlled inverter and/or a current controlled inverting current sink is used.

The functionality of the previously described test circuit 62 enhancing the safety can also be achieved when the current source 112 and the current sink 118 are exchanged with respect to the described embodiment. An incoming current flow which is generated by a current source 112 is then expected at the current direction element 120 for an error-free operation, in such a way that the current direction element 120 is preferably configured to recognize an error from the fact that—in an unexpected manner—an outgoing current flow is present at the current direction element or an incoming current flow is present which has a level which is not expected for an error-free operation. The current sink 118 is then preferably configured or wired in such a way that an outgoing current flow from the current sink 118 is prevented. For this purpose, for example, a diode, corresponding to the diode 124 connected to the output of the current source 112 as shown in FIG. 9 can be provided at the output of the current sink 118 which has a polarization opposing that with respect to the illustration in FIG. 5.

FIG. 8 shows a safety system in accordance with a further embodiment of the invention which, apart from the differences described in the following substantially corresponds to the embodiment shown in FIGS. 1 and 2 and has a plurality of safety related participants 22. The upper illustration in FIG. 8 in this connection shows a schematic view and the lower illustration in FIG. 8 shows a substantially photographic view of the same safety system. Elements corresponding to one another in both illustrations bear the same reference numerals.

The safety system comprises a safety control 10 which is arranged in a switching cabinet 11 as well as a main module 12 and an input/output module 14, which are connected to one another via a non-illustrated bus bar, wherein the input/output module 14 comprises an output X1, a safety input I1 as well as a non-secure standard input I2. A current supply unit 16 for the current supply of the safety system is further arranged in the switching cabinet 11 and is configured as a switching power supply which makes available a direct voltage potential and/or a constant voltage with respect to ground having a high level of, for example 24V and a ground potential and/or a constant direct voltage potential having a low level of e.g. 0 V with respect to ground, wherein the direct voltage potential having the high level is provided at a connection A1 of the main module 12 and the direct voltage potential having the low level is provided at a connection A2 of the main module 12.

The safety system comprises a test signal line configured as a bus line 18 having a plurality of cables configured as bus cables 20, wherein one of the bus cables 20 is connected to the safety control 10. The safety system further comprises a plurality of safety related participants 22 which are connected to one another behind one another in a line via the bus cables 20 and are connected to the safety control 10 via the bus line 18. A termination element 32 is present at the end of the line formed by the safety related participants 22 which in the present example is connected to the last safety related participant 22 of the line, this means without a cable being switched there between. In principle, the termination element 32 could, however, be connected to the bus line 18 via a further bus cable.

The protective device 24, the interconnection modules 26 and the termination element 32 respectively have an own housing which is preferably configured in accordance with the housing protective type IP 67 or IP 20 or a different housing protective type protecting against contamination or humidity.

The bus line 18 and the safety related participants 22 connected to the bus line 18 form a test signal path 36 having a forward path 38 connected to the output X1 of the safety control 10 and a return path 40 connected to the safety input I1 of the safety control 10, wherein the forward path 38 and the return path 40 are connected to one another via the termination element 32 and both the forward path 38 as well as the return path 40 run through the same safety related participants 22. The safety related participants 22, the bus line 18 and the termination element 32 furthermore form a data path 42 which comprises a data forward path formed by the forward path 38 of the test signal path 36, this means it is identical to this and a separate data return path 44 connected to the input I2 of the safety control 10 which together form a ring bus line. Furthermore, a first current supply line 46 routed via the connection A1 of the main module 12 and a second current supply line 48 routed via the connection A2 of the main module 12 are provided via which the safety control 10, the safety related participants 22 and the termination element 32 are supplied with a current. As is indicated in the example of the right hand side safety related participant 22 in FIG. 8 the interconnection cables 30 can respectively comprise a first and a second current supply conductor 46', 48' via which the respective protective device 24 can be connected to the first and to the second current supply lines 46, 48 and can thereby be supplied with a current.

As is shown in FIG. 8 the test signal path 36, the data path 42, the first current supply line 46 and the second current supply line 48 are arranged in the common bus line 18 and are all guided in the same common bus cable 20 of the bus line 18. The bus cables 20 in this connection respectively have an electrically conductive conductor for the forward path 38 of the test signal path 36 which simultaneously represents the data forward path, for the data return path 44, for the first current supply line 46 and for the second current supply line 48 in such a way that the complete cabling of the safety related participants 22 with the safety control 10 is realized by a line-shaped bus line 18 composed of bus cables 20 each having at least five conductors. Thus, only precisely one bus cable 20 is required in order to connect two adjacent safety related participants 22 to one another and/or to the safety control 10.

An output signal is generated by the safety control 10 and is transmitted via the output X1 to the forward path 38. This output signal is directly looped through and without the possibility of interruption substantially unchanged in the interconnection modules 26 of the safety related participants 22 as is evident from FIG. 8 and are transmitted substantially unchanged to the termination element 32. At the same time a respective evaluation unit 50 having a microprocessor 52 is provided in the interconnection modules 26. The evaluation unit 50 having the microprocessor 52 which carries out the herein described discrepancy check and controls the interruption switch 66 in this embodiment still satisfies further functions and in this connection can also be referred to as a logic unit. The evaluation unit 50 is connected to the forward path 38 via a signal path 54 and is adapted to monitor the output signal transmitted at the forward path 38, for example, for the purpose of a synchronization.

The output signal generated by the safety control and transmitted via the forward path 38 preferably is based on an electrical voltage and has synchronization features periodically arising at a predefined cycling time and has data features arranged between the synchronization features which data features respectively represent a data bit of the output data transmitted by the safety control 10.

The termination element 32 is adapted to receive the output signal from the return path 38 and to transmit a test signal to the return path 40 of the test signal path 36 in dependence on the output signal received from the forward path 38, said test signal being changed with respect to the received output signal. The test signal transmitted via the return path 40 is thus different from the output signal transmitted by the safety control 10. For this purpose the termination element 32 likewise has a logic unit 56 having a microprocessor 58 connected to the forward path 38 which receives and evaluates the output signal transmitted via the forward path 38. The logic unit 56 is connected to a test signal generator 60 of the termination element 32 and controls this in order to actively generate a test signal and to transmit this to the return path 40 of the test signal path 36 connected to the test signal generator 60 in a signal driving manner.

The return path 40 of the test signal path 36 runs through the safety related participants 22. These are adapted to interrupt the return path 40 on a presence or on an occurrence of a non-secure state of their respective protective device 24. The interconnection modules 26 respectively have a test circuit 62 which is, for example, configured as previously described and which is connected to generally two protective channels of the respective protective device via connections 64 of the interconnection line 30 as described, wherein the test circuit 62 brings about an interruption of the return path 40 of the test signal path 36 in cooperation with the protective channels of the protective device 24.

The logic units 56, 50 of the termination element 32 and the interconnection modules 26 are respectively arranged in the data path 42 and/or in the data return path 44 and are adapted to receive data via the data path 42 and to transmit this to the data return path 44. The data generated by a safety related participant 22 and transmitted via the data return path 44 preferably comprises diagnostic information and/or status information generated by the respective safety related participant 22. This can, in particular represent information on the safety relevant switching state of the respective protective device 24 which is also decisive for the interruption of the test signal path, this means whether a state taken on by the protective device 24 is secure or non-secure. Thereby, the safety control 10 is enabled to determine, in the case of a triggering of a safety related cutoff, which safety related participant 22 caused the cutoff. Also the data transmitted from a safety related participants 22 to the safety control can identify an arising discrepancy error and preferably identify the erroneous safety related participant 22.

The interconnection modules 26 each have an input/output interface, in particular a binary, input/output interface 68, connected to the logic unit 50 via a signal path 54 which input/output interface is connected to an input/output interface, in particular a binary and/or non-secure input/output interface 68 of the protective device 24 via a signal conductor 70 provided in the interconnection line 30 in order to transmit data received via the data return path 44 to the protective device 24 received via the data return path 44 and/or to transmit output data generated by the protective device 24 to the safety control 10 via the data return path 44.

The safety control 10 is adapted to receive the signal transmitted via the return path 40 of the test signal path 36 and to compare this to an expectation configured in the safety control 10. A cross-circuit, for example, between the forward path 38 and the return path 40 of the test signal path 36 leads to an absence of such an expected signal at the safety input I1, since the test signal transmitted via the return path 40 differs from the output signal transmitted via the forward path 38 during the operation of the safety system and only the test signal corresponds to the expectation of the safety control 10. Such a functional error, as can, for example, arise for a squashing of a bus cable 20 thus reliably leads to a violation of the expectation of the safety control and to a safety related cutoff in such a way that a tolerance of such a state of error is excluded by the safety control 10.

The forward path 38 of the test signal path 36 together with the data return path 44 forms a ring-shaped data path 42 configured as a ring bus via which the safety control 10, the termination element 32 and the safety related participants 22 communicate with one another and indeed in accordance with a kind of subsequently described daisy-chain bus communication, in particular in accordance with the master-slave-principle. The safety control 10, the termination element 32 and the safety related participants 22 in this connection form the participants of the bus communication, wherein the safety control 10 simultaneously represents the bus master.

In order to receive data from the data path 42 and to transmit data via the data path 42 each participant 22, 32 is configured to receive an incoming data signal transmitted via the data path 42 at an input, to process the received data and to preferably simultaneously transmit an outgoing data signal to the data path 42 at an output different from the input in such a way that the participants 22, 32 form a communication chain in which the data is transmitted in a predefined data flow direction from a participant 22, 32 to the next. The logic units 50, 56 of the safety related participants 22 and the termination element 32 in this connection serve as a transmission and reception circuit via which the respective participants 22, 32 receive and transmit data.

Instead of the safety control 10 also a different suitable safety unit can be used in this embodiment.

LIST OF REFERENCE NUMERALS 10 safety unit, safety control
11 switching cabinet
12 main module
14 input/output module
16 current supply unit
18 bus line, test signal line
20 cable, bus cable
22 safety related participant
24 protective device
26 interconnection module
28 interconnection cable
30 interconnection line
32 termination element
34 plug connection
36, 36' test signal path
38, 38' forward path, data forward path
40, 40' return path of the test signal path
42 data path
44 data return path
46 first current supply line
46' first current supply conductor
48 second current supply line
48' second current supply conductor
50 evaluation unit, logic unit
52 microprocessor
54 signal path
56 logic unit
58 microprocessor
60 test signal generator
62 test circuit
64 connection
66, 66' interruption switch
68 input/output interface
70 signal conductor
80 test signal
82 test gap
96a, 96b switch
98, 98a, 98b forward line
100, 100a, 100b return line
105a, 105b switch
106 test signal input
108 test signal output
110 inverter
112 controlled current source
114 current flow element
116 inverter
118 controlled current sink
120 current direction element
121 Zener diode
122 dynamic unit
124 diode
125 signal amplifier
A1 direct voltage connection
A2 ground connection
$i_{in}$ incoming electric current
$i_{out}$ outgoing electric current
$I_{112}, I_{118}$ current signal
I1, I1' safety input
I2 input
U electric voltage
$U_{110}, U_{114}$ voltage signal
$U_{116}, U_{120}$ voltage signal
X1, X1' output

The invention claimed is:

1. A safety system comprising
a safety unit (10);
at least one safety related participant (22) which comprises a protective device (24) and a first interruptible signal transmission path and a second interruptible signal transmission path which can be interrupted together on the occurrence of a non-secure state of the protective device (24); and
at least one test signal path (36) which starting from an output (X1) of the safety unit (10) runs through the at least one safety related participant (22) to a safety input (I1) of the safety unit (10) and which comprises at least one of the first and the second interruptible signal transmission paths,
wherein
the safety related participant (22) comprises an interruption switch (66) arranged in the test signal path (36) and an evaluation unit (50) which is connected to the first signal transmission path and/or to a first switching signal output of the protective device (24) controlling the interruption of the first signal transmission path, which evaluation unit is connected to the second signal transmission path and/or to a second switching signal output of the protective device (24) controlling the interruption of the first signal transmission path and which evaluation unit is configured to check whether the first and the second signal transmission path together are interrupted or are controlled for interruption and to open the interruption switch (66) when the first and the second interruptible signal transmission paths together are not interrupted or controlled for interruption;
the safety related participant (22) comprises an interconnection module (26) connected to the protective device (24) of the safety related participant via which interconnection module the safety related participant (22) is integrated in the safety system;
the first and/or the second interruptible signal transmission path of the safety related participant (22) comprise(s) a switch (96a, 96b) arranged in the protective device (24) which switch is integrated in the test signal path (26) via a forward line (98a, 98b) and a return line (100a, 100b), wherein the forward line (98a, 98b) and the return line (100a, 100b) are arranged in an interconnection line (28) connecting the protective device (24) and the interconnection module (26); and/or wherein
the first and/or the second interruptible signal transmission paths of the safety related participant (22) comprise(s) a switch (105a, 105b) arranged in the interconnection module (26) which switch is connected to the switching signal output of the protective device (24) controlling the interruption of the switch (105a, 105b) via a switching signal line, wherein the switching signal line is arranged in an interconnection line (28) connecting the protective device (24) and the interconnection module (26).

2. The safety system in accordance with claim 1, wherein the safety unit is a safety control.

3. The safety system in accordance with claim 1, wherein the two interruptible signal transmission paths of the safety related participants (22) are electrically connected to one another in series in the test signal path (36).

4. The safety system in accordance with claim 1, wherein at least one of the interruptible signal transmission paths of the safety related participant is electrically connected in series to an interruptible signal transmission path of a further safety related participant (22) of the safety system arranged in the test signal path (36).

5. The safety system in accordance with claim 1, wherein
the evaluation unit (50) is configured to check whether the two signal transmission paths are simultaneously interrupted or controlled for interruption apart from a predefined discrepancy time; and/or wherein
the evaluation unit (50) is configured to check whether the two signal transmission paths of the protective device (24) are simultaneously closed or controlled for closure apart from a predefined discrepancy time.

6. The safety system in accordance with claim 1, wherein the first and/or the second interruptible signal transmission path comprise(s) an electric switching path having an electric or electronic switch (96a, 96b, 105a, 105b) or an interruptible optical signal transmission path.

7. The safety system in accordance with claim 1, wherein the evaluation unit (50) of the safety related participant (22) is adapted to close the interruption switch (66) again only after an error acknowledgement following the opening of the interruption switch (66).

8. The safety system in accordance with claim 1, wherein
the error acknowledgement can be carried out at the safety related participant through a user input at the safety related participant (22) and/or wherein
the evaluation unit (50) is adapted to monitor whether a complete orderly switching sequence of the first and the second interruptible signal transmission paths arises at the safety related participant (22) and to acknowledge this error in this case.

9. The safety system in accordance with claim 1, wherein the safety related participant (22) comprises a notification unit which is configured to generate a notification perceivable by a user at the safety related participant (22) in dependence on the check carried out by the evaluation unit of whether the two signal transmission paths together are interrupted or controlled for interruption.

10. The safety system in accordance with claim 1, wherein the safety related participant (22) is adapted to transmit a data message to the safety unit (10) when it is recognized by the evaluation unit (50) that the two signal transmission paths were together not interrupted or controlled for interruption due to an error, wherein the safety unit (10) is adapted to identify the error and/or the defective safety related participant (22) by means of the data message.

11. A safety system comprising
a safety unit (10);
at least one safety related participant (22) which comprises a protective device (24) and a first interruptible signal transmission path and a second interruptible signal transmission path which can be interrupted together on the occurrence of a non-secure state of the protective device (24); and
at least one test signal path (36) which starting from an output (X1) of the safety unit (10) runs through the at least one safety related participant (22) to a safety input (I1) of the safety unit (10) and which comprises at least one of the first and the second interruptible signal transmission paths,
wherein
the safety related participant (22) comprises an interruption switch (66) arranged in the test signal path (36) and an evaluation unit (50) which is connected to the first signal transmission path and/or to a first switching signal output of the protective device (24) controlling the interruption of the first signal transmission path, which evaluation unit is connected to the second signal transmission path and/or to a second switching signal output of the protective device (24) controlling the interruption of the first signal transmission path and which evaluation unit is configured to check whether the first and the second signal transmission path together are interrupted or are controlled for interruption and to open the interruption switch (66) when the first and the second interruptible signal transmission paths together are not interrupted or controlled for interruption;
the safety related participant (22) comprises an interconnection module (26) connected to the protective device (24) of the safety related participant via which interconnection module the safety related participant (22) is integrated in the safety system;
the interconnection module (26) comprises a test signal input (106) for an incoming test signal and a test signal output (108) for an outgoing test signal, wherein the protective device (24) is connected to the interconnection module (26) via an interconnection line (28) and comprises two switches (96a, 96b) which are respectively connected to the interconnection module (26) via a forward line (98a, 98b) and a return line (100a, 100b) of the interconnection line (28) for the formation of the first and the second interruptible signal transmission paths;
the interconnection module (26) comprises a test circuit (62) for the two signal transmission paths, said test circuit comprising a controlled current source (112), a controlled current sink (118) and a current direction element (120);
the test signal input (106) of the interconnection module (26) is connected to a control input of the controlled current source (112) or of the controlled current sink (118) in such a way that the controlled current source (112) or current sink (118) can be controlled by the incoming test signal (80) or a signal (U110) derived therefrom and wherein a controlled output of the same one of the current source (112) and the current sink (118) is connected to the forward line (96a) of the first switching path in order to transmit a current via the first switching path;
a control input of the respective other one of the controlled current source (112) and the controlled current sink (118) is connected to the return line (100a) of the first signal transmission path in such a way that the controlled current source (112) or current sink (118) can be controlled by the current signal (I112) transmitted via the signal transmission path or a signal (U116) derived therefrom;
a controlled output of the other one of the controlled current source (112) and current sink (118) is connected to the forward line (98b) at the second switching path in order to transmit a current via the second switching path;
the return line (100b) of the second switching path is connected to the current direction element (120) which is configured to provide a signal (U120) dependent on the current transmitted via the second switching path; and the test signal output (108) of the interconnection module (26) is connected to the current direction element (120) in order to output the signal (U120) generated by the current direction element (120) or a signal derived therefrom as an outgoing test signal of the safety related participant (22).

12. A safety system comprising
a safety unit (10);
at least one safety related participant (22) which comprises a protective device (24) and a first interruptible signal transmission path and a second interruptible signal transmission path which can be interrupted together on the occurrence of a non-secure state of the protective device (24); and
at least one test signal path (36) which starting from an output (X1) of the safety unit (10) runs through the at least one safety related participant (22) to a safety input (I1) of the safety unit (10) and which comprises at least one of the first and the second interruptible signal transmission paths,
wherein
the safety related participant (22) comprises an interruption switch (66) arranged in the test signal path (36) and an evaluation unit (50) which is connected to the first signal transmission path and/or to a first switching signal output of the protective device (24) controlling the interruption of the first signal transmission path, which evaluation unit is connected to the second signal transmission path and/or to a second switching signal output of the protective device (24) controlling the interruption of the first signal transmission path and which evaluation unit is configured to check whether the first and the second signal transmission path together are interrupted or are controlled for interruption and to open the interruption switch (66) when the first and the second interruptible signal transmission paths together are not interrupted or controlled for interruption;

the test signal path (36) is at least regionally arranged in a bus line (18) and the safety system comprises at least one further safety related participant (22) connected to the bus line (18), said safety related participant comprising a protective device (24), wherein the safety related participants (22) form the test signal path (36) together with the bus line (18), wherein the test signal path (36) has a forward path (38) connected to the output (X1) of the safety unit (10) and has a return path (40) connected to the safety input (I1) of the safety unit (10);

the safety related participants (22) are arranged along the bus line (18) in a line in such a way that both the forward path (38) and the return path (40) of the test signal path (36) run through the same safety related participants (22); and wherein the safety related participants (22) are adapted in such a way that the presence of a non-secure state of their protective device (24) brings about an interruption of the test signal path (36);

the safety system further comprises a termination element (32) connected at the end of the line and connecting the forward path (38) and the return path (40) of the test signal path (36); wherein the safety unit (10) is configured to transmit an output signal at its output (X1) connected to the forward path (38); and the termination element (32) is configured to receive the output signal from the forward path (38) and to output a test signal to the return path of the test signal path, said test signal being changed with respect to the received output signal in dependence on the output signal received from the forward path (38).

* * * * *